(12) United States Patent
Kawai

(10) Patent No.: US 8,218,060 B2
(45) Date of Patent: *Jul. 10, 2012

(54) IMAGING APPARATUS

(75) Inventor: Sumio Kawai, Hachioji (JP)

(73) Assignee: Olympus Imaging Corporation, Tokyo (JP)

( * ) Notice: Subject to any disclaimer, the term of this patent is extended or adjusted under 35 U.S.C. 154(b) by 249 days.

This patent is subject to a terminal disclaimer.

(21) Appl. No.: 12/776,956

(22) Filed: May 10, 2010

(65) Prior Publication Data
US 2010/0220394 A1    Sep. 2, 2010

Related U.S. Application Data

(63) Continuation-in-part of application No. 12/493,423, filed on Jun. 29, 2009.

(30) Foreign Application Priority Data

Oct. 10, 2008  (JP) ................................. 2008-264504
Oct. 6, 2009   (JP) ................................. 2009-232779

(51) Int. Cl.
  *H04N 5/225*  (2006.01)
  *H04N 5/228*  (2006.01)
(52) U.S. Cl. .................... 348/340; 348/208.11
(58) Field of Classification Search ............ 348/208.11, 348/246, 296, 340, 335; 396/261
See application file for complete search history.

(56) References Cited

U.S. PATENT DOCUMENTS

| | | | |
|---|---|---|---|
| 7,006,138 B2 | 2/2006 | Kawai | |
| 7,609,315 B2 * | 10/2009 | Kawai | 348/340 |
| 7,830,444 B2 * | 11/2010 | Matsumoto | 348/340 |
| 2008/0297651 A1 * | 12/2008 | Urakami et al. | 348/374 |
| 2009/0002542 A1 | 1/2009 | Ito et al. | |
| 2010/0091121 A1 | 4/2010 | Kawai | |

FOREIGN PATENT DOCUMENTS

| | | |
|---|---|---|
| JP | 2002-204379 A | 7/2002 |
| JP | 2006-217536 A | 8/2006 |
| JP | 2007-218957 A | 8/2007 |
| JP | 2007-282101 A | 10/2007 |

OTHER PUBLICATIONS

Japanese Office Action dated Sep. 14, 2010 and English translation of the relevant parts therein, in counterpart Japanese Application No. 2009-232779.

* cited by examiner

*Primary Examiner* — Lin Ye
*Assistant Examiner* — Euel Cowan
(74) *Attorney, Agent, or Firm* — Holtz, Holtz, Goodman & Chick, PC

(57) ABSTRACT

An imaging apparatus includes: an image-forming element; an optical element including a light-transmitting portion disposed so as to face an image surface of the image-forming element; a vibration-application member arranged at a position other than a position of the light-transmitting portion of the optical element, for vibrating a surface of the optical element and inside of the optical element; and a vibration-absorption member arranged at a position opposed to the vibration-application member, for absorbing a part of vibration of the optical element in a predetermined cycle, wherein when a wavelength of vibration generated in the optical element by vibration of the vibration-application member is defined as $\lambda$, and an odd number as k, the vibration-application member and the vibration-absorption member are arranged separately from each other at positions on the optical element such that a distance between centers of the members is expressed by $k \times \lambda/4$.

9 Claims, 16 Drawing Sheets

$L_k = 1/((2\pi f_0)^2 \cdot C_0)$ $C_s = \dfrac{\{1+(2\pi f_0 \cdot C_0 \cdot R)^2\} \cdot C_0}{(2\pi f_0 \cdot C_0 \cdot R)^2}$ $R_s = R/\{1+(2\pi f_0 \cdot C_0 \cdot R)^2\}$

IMAGING APPARATUS

This application is a continuation-in-part of U.S. application Ser. No. 12/493,423 filed on Jun. 29, 2009 and claims the benefit of Japanese Applications No. 2008-264504 filed in Japan on Oct. 10, 2008 and 2009-232779 filed in Japan on Oct. 6, 2009, the entire contents of which are incorporated herein by their reference.

BACKGROUND OF THE INVENTION

1. Field of the Invention

The present invention relates to an imaging apparatus, and more particularly to an imaging apparatus including an image forming element, for example, an imaging apparatus such as an image projection apparatus which is provided with an image pickup apparatus including an image pickup device for obtaining an image signal corresponding to light irradiated on an photoelectric conversion surface of the image pickup device itself and a display element for displaying an image to be projected on a screen, and also relates to a structure for vibrating an optical element arranged in front of an image forming element in such an imaging apparatus.

2. Description of the Related Art

In recent years, image qualities have been greatly improved in imaging apparatuses using an image forming element, such as image projecting apparatuses which include an image pickup apparatus using an image pickup device and a display element such as a liquid crystal. Therefore, such a serious problem occurs that dust adheres to a surface of an image forming element such as image pickup device and a display element, or to a surface of a transparent member (optical element) located in front of the image forming element and the dust causes a shadow on an image to be generated.

For example, a digital single-lens reflex camera with an interchangeable lens has a photographing optical system which is attachable and detachable to and from a camera main body. A user can change the photographing optical systems by arbitrarily attaching and detaching a desired photographing optical system to and from the camera main body when the user desires, which enables selective use of various photographing optical systems in a single camera main body. In the single-lens reflex camera, when the photographing optical system is detached from the camera main body, dust suspended in an ambient environment where the camera is placed invades the camera main body. There is another possibility that dirt and the like are generated during operation of various mechanisms arranged in the camera main body, such as a shutter and diaphragm mechanism that mechanically operates, so that there is concern about an influence caused by the dirt.

As is known, in conventional digital single-lens reflex cameras, in order to restrain adherence of dust and the like to a photoelectric conversion surface of an image pickup device, a dust-proof member configured of an optical element is arranged in front of the photoelectric conversion surface of the image pickup device. In such cameras, the space between the photoelectric conversion surface of the image pickup device and the dust-proof member is sealed and a standing wave having a predetermined amplitude is applied to the dust-proof member using vibration-applying means, thereby removing dust and the like adhered on the outer surface side of the dust-proof member.

An image pickup apparatus disclosed in Japanese Patent Application Laid-Open Publication No. 2007-282101 includes on one end portion of a dust-proof member a first comb-shaped electrode, and on the other end of the dust-proof member a second comb-shaped electrode and a vibration-absorbing member. A surface acoustic wave is generated by applying alternate current to the first comb-shaped electrode and the generated surface acoustic wave is made to travel to the second comb-shaped electrode and the vibration-absorbing member. In the image pickup apparatus, the second comb-shaped electrode and the vibration-absorbing member are provided to absorb the surface acoustic wave and restrain the occurrence of a reflected wave of the surface acoustic wave, thereby preventing the surface acoustic wave traveled by the reflected wave from becoming a standing wave.

Furthermore, an optical filter, which is applied to an image forming apparatus disclosed in Japanese Patent Application Laid-Open Publication No. 2007-218957, is arranged on a surface of an optical member and includes a base substrate configured of a piezoelectric member, a comb-shaped electrode provided on an end portion of the base substrate, a power supply that applies voltage to the electrode, and a vibration-absorbing member. By applying voltage to the electrode, a surface acoustic wave is generated on a surface of the base substrate and reflected wave is absorbed by the vibration-absorbing member.

SUMMARY OF THE INVENTION

An imaging apparatus of the present invention includes: an image forming element having an image surface on which an optical image is generated; an optical element including a light-transmitting portion through which a subject light passes, the light-transmitting portion being disposed so as to face an image surface of the image forming element with a predetermined distance; a vibration member for vibration application arranged at a position which is other than a position where the light-transmitting portion of the optical element is arranged, the vibration member for vibration application vibrating not only a surface of the optical element but also inside of the optical element; and a vibration member for vibration absorption arranged at a position which is other than the position where the light-transmitting portion of the optical element is arranged and which is opposed to the vibration member for vibration application, the vibration member for vibration absorption absorbing a part of vibration of the optical element in a predetermined cycle, wherein when a wavelength of vibration generated in the optical element by vibration of the vibration member for vibration application is defined as $\lambda$, and an odd number as k, the vibration member for vibration application and the vibration member for vibration absorption are arranged separately from each other at positions on the surface of the optical element such that a distance between centers of the members is expressed by $k \times \lambda / 4$.

Advantages of the present invention will be more apparent from the following detailed description.

DETAILED DESCRIPTION OF THE PREFERRED EMBODIMENTS

Hereinafter embodiments of the present invention will be described with reference to the drawings by taking a digital camera which is an imaging apparatus as an example.

A specifically exemplified digital camera of the present invention includes a dust-image prevention function of an image pickup device unit that acquires an image signal by photoelectric conversion. Here, description will be made, as one example, on an improvement technology related to a dust-image prevention of a digital camera. As a first embodiment, description will be made particularly regarding a digital single-lens reflex camera with interchangeable lens (hereinafter referred to as a camera) which is a digital camera, with reference to FIGS. 1, 2, and 3.

Figure 1:
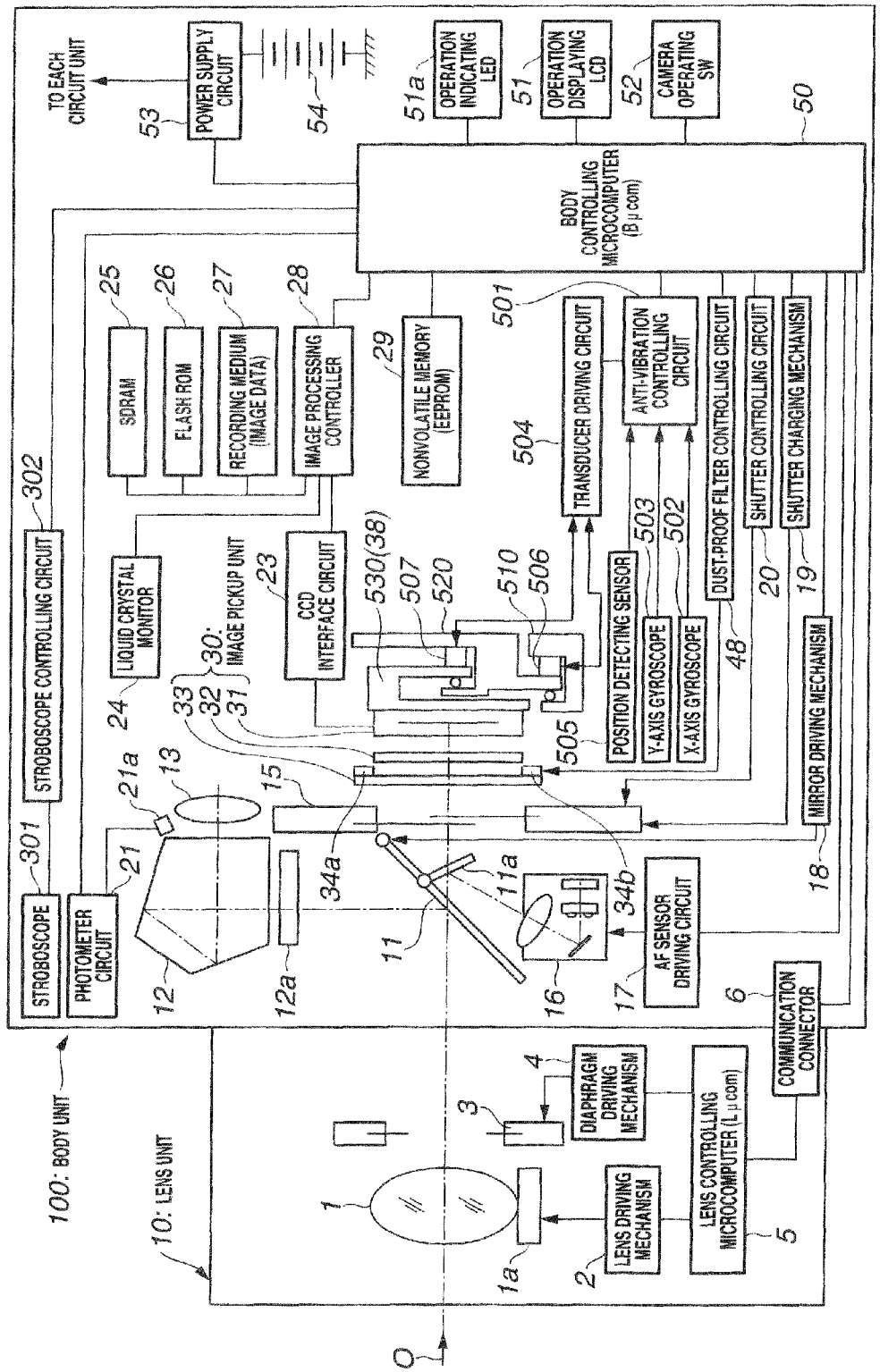
FIG. 1 is a block configurational diagram schematically and mainly showing an electric configuration of a digital camera which is an imaging apparatus (a digital single-lens reflex camera) according to a first embodiment of the present invention.
Figure 2:
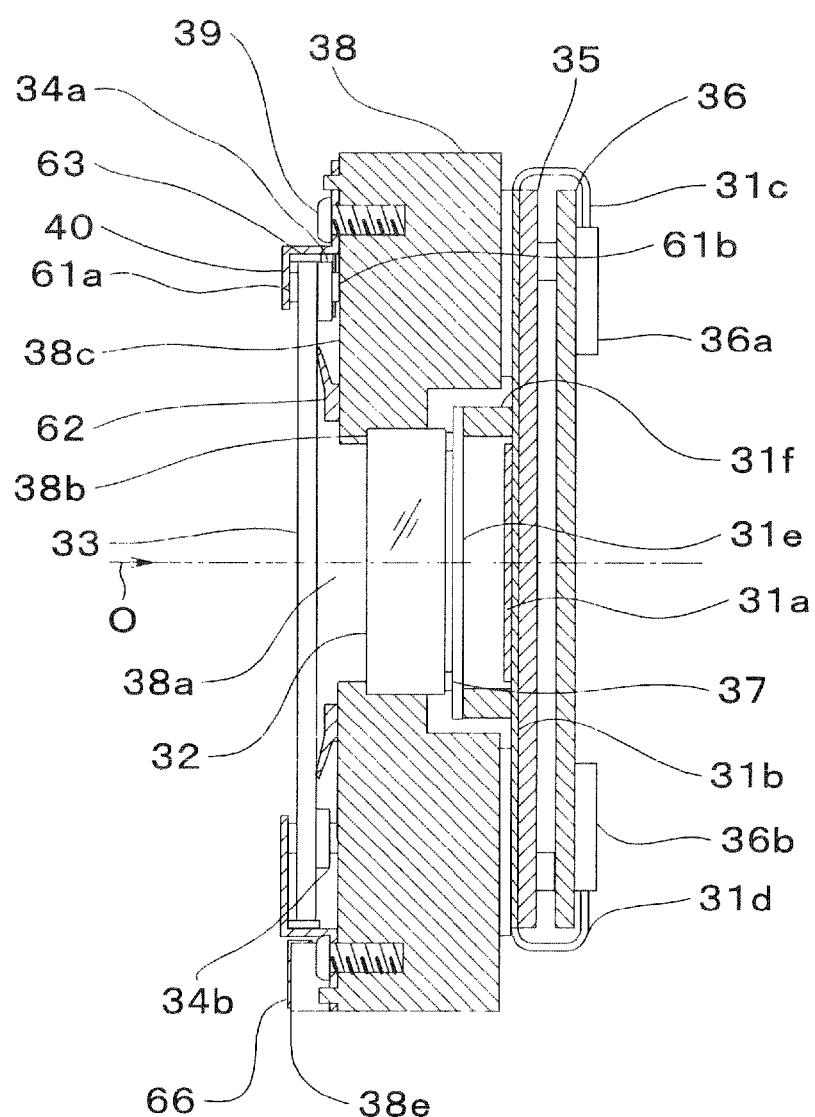
FIG. 2 is a vertical cross-sectional view showing a main part of an image pickup unit in the camera in FIG. 1.
Figure 3:
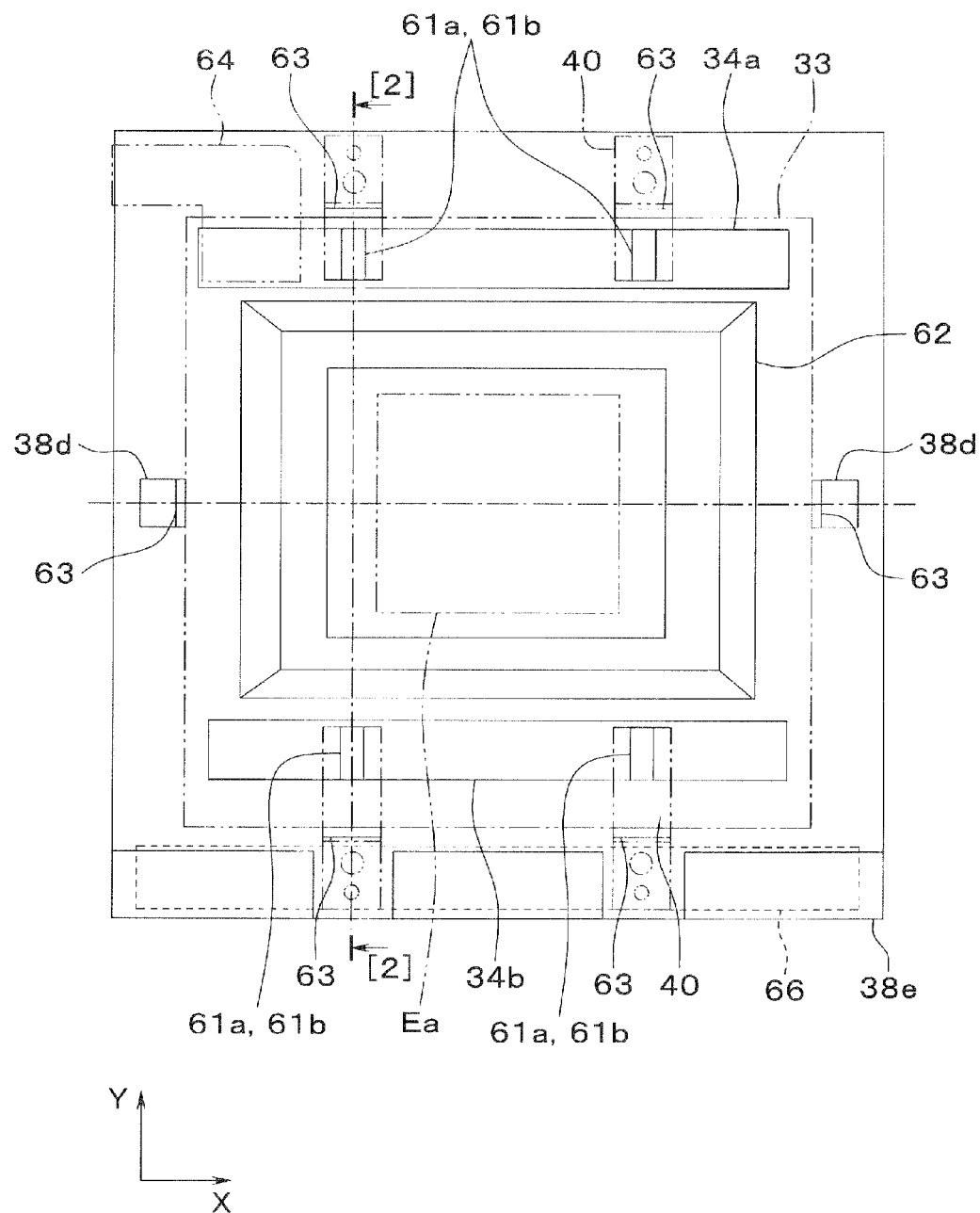
FIG. 3 is a front view showing a main part of a dust-proof mechanism in the camera in FIG. 1.

FIG. 1 is a configurational view mainly showing an electric system of the camera according to the first embodiment. FIG. 2 is a vertical cross-sectional view showing an image pickup unit including a dust-proof mechanism of a camera according to the present embodiment. FIG. 3 is a front view showing a state where the dust-proof filter of the image pickup unit is detached, viewed from a photographing lens side.

First, description will be made on a system configuration of the camera according to the present embodiment with reference to FIG. 1. The camera according to the present embodiment has a system configured of a body unit 100 as a camera main body, and a lens unit 10 as an interchangeable lens which is one of accessory apparatuses.

Note that, in the description below, an optical axis of a photographing lens 1 (FIG. 1) of the lens unit 10 in a state where the lens unit 10 is mounted to the body unit 100 is defined as an optical axis O, a direction parallel to the optical axis O as a Z direction, a subject side as front, and an image forming side as rear. In addition, in a normal photographing state where the camera is held such that the Z direction is horizontal, among the directions perpendicular to the Z direction, the vertical direction is defined as a Y direction (up/down direction) and the left/right direction as an X direction.

The lens unit 10 is attachable and detachable to and from the body unit 100 through a lens mount, not shown, provided on the front face of the body unit 100. The lens unit 10 is controlled by a lens controlling microcomputer (hereinafter referred to as Lμcom) 5 included in the lens unit itself. The body unit 100 is controlled by a body controlling microcomputer (hereinafter referred to as Bμcom) 50. When the lens unit 10 is mounted to the body unit 100, the Lμcom 5 and the Bμcom 50 are electrically connected, through a communication connector 6, so as to be communicatable with each other. The Lμcom 5 and the Bμcom 50 cooperatively operate as a camera system in which the Lμcom 5 is subordinated to the Bμcom 50.

The lens unit 10 includes a photographing lens 1 and a diaphragm 3, as shown in FIG. 1. The photographing lens 1 is advanceably/retractably supported by a lens frame 1a and driven by a DC motor, not shown, provided in the lens driving mechanism 2. The diaphragm 3 is driven by a stepping motor, not shown, provided in a diaphragm driving mechanism 4. The Lμcom 5 controls the motors based on commands from the Bμcom 50.

In the body unit 100, the components described below are disposed as shown in FIG. 1. For example, the body unit 100 includes, as an optical system, a screen 12a, a pentaprism 12, a quick return mirror 11, an eyepiece 13, and a sub-mirror 11a which are single-lens reflex components, and a focal-plane shutter 15 on the photographing optical axis O, an AF sensor unit 16 for detecting the amount of defocus based on the reflected luminous flux from the sub-mirror 11a, and a stroboscope 301 arranged on the upper portion of the pentaprism 12.

In addition, the body unit 100 includes an AF sensor driving circuit 17 that drives and controls the AF sensor unit 16, a minor driving circuit 18 that drives and controls the quick return mirror 11, a shutter charging mechanism 19 that charges springs for driving a front curtain and a rear curtain of the shutter 15, a shutter controlling circuit 20 that controls the movement of the front curtain and the rear curtain, and a photometer circuit 21 that carries out a photometric processing based on the luminous flux from the pentaprism 12 detected by a photometric sensor 21a.

An image pickup unit 30 for photoelectrically converting a subject image obtained from the subject luminous flux passed through the above-described optical system is provided on the optical axis O. The image pickup unit 30 is configured as an integral unit including a CCD 31 as an image pickup device which is an image forming element, an optical low pass filter (LPF) 32 disposed in front of the CCD 31, and a dust-proof filter 33 as a dust-proof member formed of a transparent glass plate (optical element), at least a transparent portion of which has a refractivity different from that of atmosphere. On a back face of a periphery of the dust-proof filter 33 are mounted a piezoelectric device (piezoelectric body) for vibration application 34a as a vibration member for vibration application and a piezoelectric device (piezoelectric body) for vibration absorption 34b as a vibration member for vibration absorption.

The piezoelectric devices 34a and the piezoelectric devices 34b include two electrodes (S34a1, G34a2, S34b1, G34b2; see FIG. 4), respectively. The piezoelectric device 34a, which is one of the two piezoelectric devices 34a, 34b, is vibrated at a predetermined frequency by the dust-proof filter controlling circuit 48 and a part of vibration energy is absorbed by the piezoelectric device 34b, which is the other one of the two piezoelectric devices 34a, 34b, to generate predetermined vibration in the dust-proof filter 33, thereby enabling dust adhered to the filter surface to be removed. In addition, an anti-vibration unit for camera-shake correction is attached to the image pickup unit 30.

Furthermore, as shown in FIG. 1, the camera system in the camera according to the present embodiment includes a CCD interface circuit 23 connected to the CCD 31, a liquid crystal monitor 24, and an image processing controller 28 that performs image processing using an SDRAM 25 and a FLASH ROM 26 serving as a storage region, which can provide an electronic image pickup function as well as electronic recording and displaying function. In this embodiment, a recording medium 27 is an external recording medium, such as various types of memory cards and external HDDs, and is communicatably and interchangeably mounted to the camera main body via the communication connector. Then, image data acquired by photographing is recorded in the recording medium 27. As another storage region, a nonvolatile memory 29, such an EEPROM, for storing a predetermined control parameter required for controlling the camera is provided so as to be accessible by the Bµcom 50.

The Bµcom 50 has an operation displaying LCD 51 and an operation indicating LED 51a for informing a user of the operational state of the camera by a display output, and a camera operating switch 52 (hereinafter, the switch is referred to as SW). The operation displaying LCD 51 or the operation indicating LED 51a is provided with a display portion or an indicating portion for displaying or indicating vibration operation of the dust-proof filter 33 during the period when the dust-proof driving circuit is operated. The camera operating SW 52 is a switch group including operation buttons required for operating the camera, such as a release SW, a mode changing SW, and a power SW. In addition, the Bµcom 50 is provided with a battery 54 as a power supply, a power supply circuit 53 that converts the voltage of the battery 54 to a required voltage for each circuit unit configuring the camera system and supplies the required voltage to each circuit unit, and a voltage detecting circuit that detects a voltage change that occurs when current is supplied from an external power supply via a jack.

Description will be made below on a simple overview of the operation of each component of the camera system configured as described above. First, the image processing controller 28 controls the CCD interface circuit 23 according to a command from the Bµcom 50 to acquire image data from the CCD 31. The image data is converted into a video signal by the image processing controller 28 and outputted to be displayed on the liquid crystal monitor 24. A user can check the photographed image through the displayed image on the liquid crystal monitor 24.

The SDRAM 25 is a memory for temporarily storing image data and is used as a work area for conversion of the image data. The image data is converted into JPEG data, and thereafter stored in the recording medium 27.

The mirror driving mechanism 18 is a mechanism for driving the quick return mirror 11 to move it to an up position and a down position. When the quick return mirror 11 is located at the down position, the luminous flux from the photographing lens 1 is divided to be guided toward the AF sensor unit 16 and toward the pentaprism 12. The output from an AF sensor in the AF sensor unit 16 is transmitted via the AF sensor driving circuit 17 to the Bµcom 50 where a well-known ranging processing is performed. On the other hand, a part of the luminous flux passed through the pentaprism 12 is guided to the photometric sensor 21a in the photometer circuit 21 where a well-known photometric processing is performed based on the amount of detected light.

Figure 4:
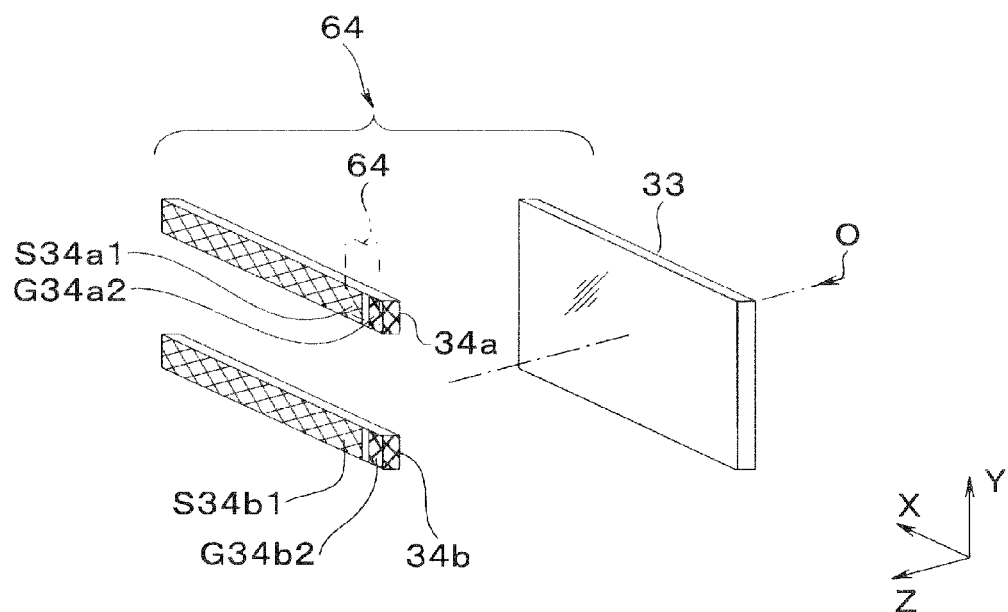
FIG. 4 is a perspective view showing the main part of the dust-proof mechanism in the camera in FIG. 1.

Next, the image pickup unit 30 including the CCD 31 will be described with reference to FIGS. 2, 3, and 4. Note that, as described above, FIG. 2 is a vertical cross-sectional view showing the exemplary configuration of the image pickup unit 30 (shown by the cross section along the line [2]-[2] in FIG. 3). FIG. 3 is a front view of the dust-proof filter in a case where the dust-proof filter is detached from the image pickup unit 30. FIG. 4 is an exploded perspective view of the dust-proof filter and the piezoelectric devices in the image pickup unit 30.

Figure 6:
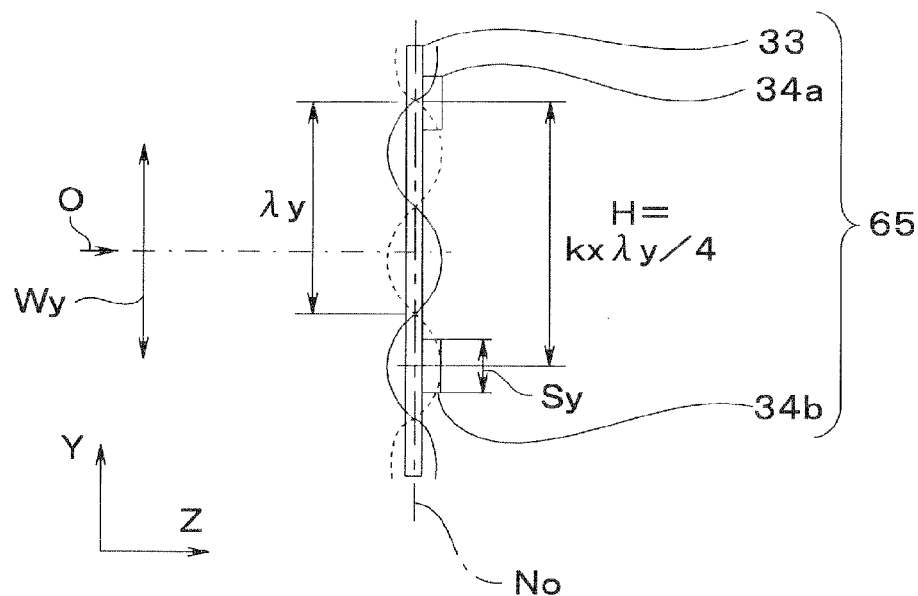
FIG. 6 is a cross-sectional view taken along the line [6]-[6] of FIG. 5.
Figure 8:
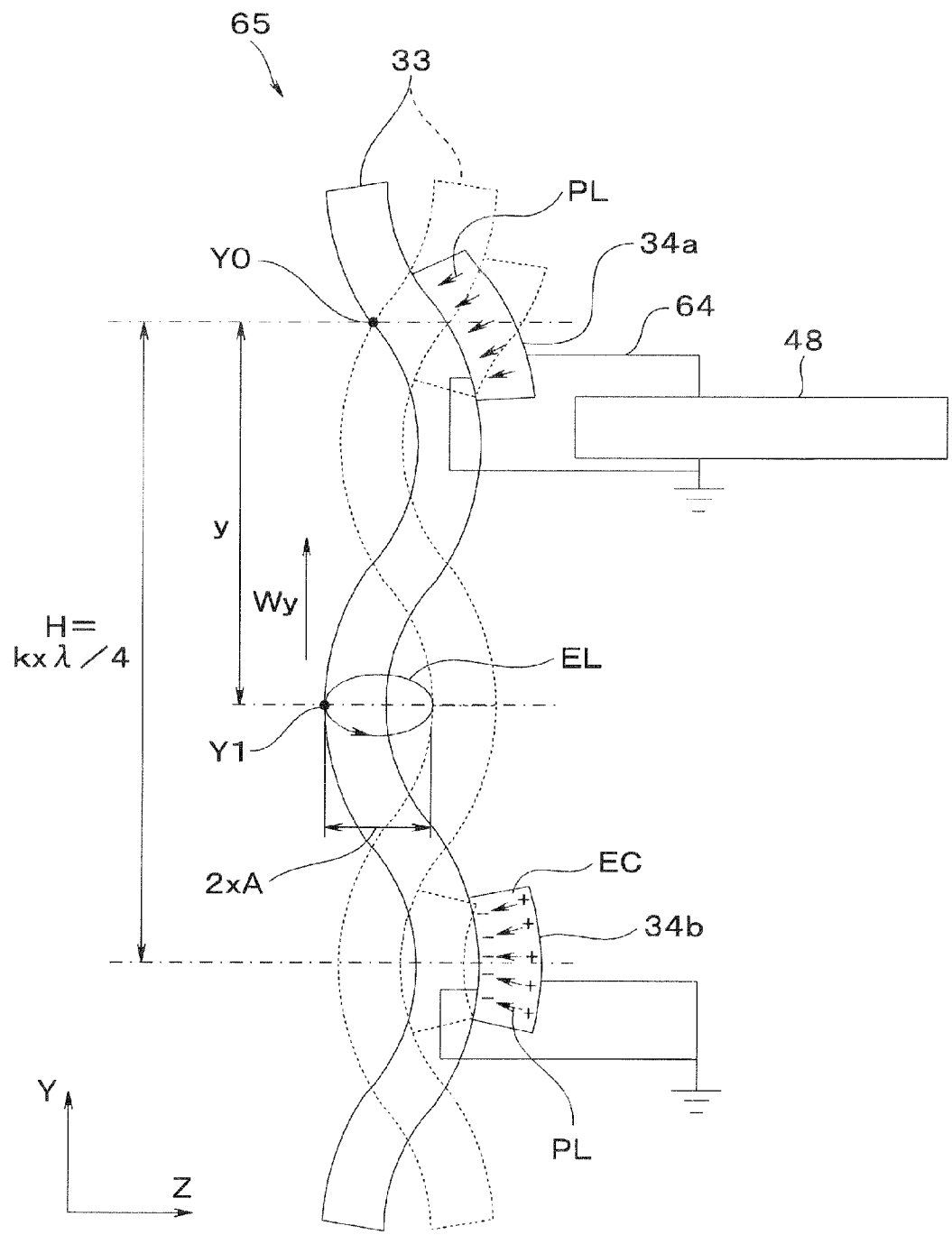
FIG. 8 is a concept view showing the vibration of the dust-proof filter in the camera in FIG. 1.

The image pickup unit 30 includes: the CCD 31 as an image pickup device (image forming element) for acquiring an image signal corresponding to the light passed through the photographing optical system and irradiated on the photoelectric conversion surface of the CCD; the optical low pass filter (LPF) 32 disposed on the photoelectric conversion surface side (front face side) of the CCD 31, for removing a high-frequency component from the subject luminous flux which is passed through the photographing optical system and irradiated to the optical low pass filter; and a dust-proof transducer 65 configured of the dust-proof filter 33 arranged as a dust-proof mechanism so as to face the front face side of the optical LPF 32 with a predetermined distance, the piezoelectric device 34a for applying a predetermined vibration to the dust-proof filter 33, and the piezoelectric device 34b for absorbing a part of vibration energy, the piezoelectric devices 34a, 34b being disposed on periphery of the dust-proof filter 33 (FIGS. 4, 6, and 8).

A CCD chip 31a of the CCD 31 is directly mounted on a FPC 31b as a flexible printed circuit disposed on a fixing plate 35, and connecting parts 31c and 31d, which are respectively extended from opposite ends of the FPC 31b, are connected to a main circuit substrate 36 via connectors 36a and 36b provided on the main circuit substrate 36. The cover glass 31e of the CCD 31 is fixed to the FPC 31b with a spacer 31f interposed therebetween.

A filter receiving member 37 made of a resilient member or the like is disposed between the CCD 31 and the optical LPF 32. The filter receiving member 37 is disposed at a position on a front face-side periphery of the CCD 31 so as to avoid the effective area of the photoelectric conversion surface and comes into contact with the vicinity of back face-side periphery of the optical LPF 32, thereby keeping the airtightness between the CCD 31 and the optical LPF 32. In addition, a holder 38 that airtightly covers the CCD 31 and the optical LPF 32 is disposed. The holder 38 has at the substantially center part thereof a rectangular-shaped opening 38a for transmitting a subject luminous flux. A stepped portion 38b, a cross section of which is substantially L-shaped is formed on an inner periphery on the dust-proof filter 33 side of the opening 38a, and the optical LPF 32 and the CCD 31 are disposed behind the opening 38a. The optical LPF 32 is disposed in such a manner that a front face-side periphery thereof substantially airtightly comes into contact with the stepped portion 38b, so that the stepped portion 38b restricts the position of the optical LPF 32 in the photographing optical axis direction and prevents the optical LPF 32 from slipping out from inside the holder 38 to the front face side.

On the other hand, in order to hold the dust-proof filter 33 in front of the optical LPF 32 with a predetermined distance, a dust-proof filter receiving portion 38c is formed, over the entire circumference of a front face-side periphery of the holder 38, so as to surround the stepped portion 38b and protrude more toward the front face side than the stepped portion 38b. The dust-proof filter 33, which is formed in a polygonal plate-like shape as a whole and a rectangular (quadrilateral) shape in the present embodiment, is supported by the dust-proof filter receiving portion 38c in a state where the dust-proof filter 33 is pressed against the dust-proof filter receiving portion 38c by a pressing member 40 which is made of a resilient body such as a plate spring and fixed to the dust-proof filter receiving portion 38c with a screw 39. The dust-proof filter 33 is supported spaced a predetermined distance from the photoelectric conversion surface (image pickup surface) of the CCD 33 in the Z direction, in a state where the dust-proof filter 33 is along a plane (XY plane) perpendicular to the optical axis O, in other words, in a state where the plane is along the vertical direction in the normal photographing state where the optical axis O is horizontal with respect to the plane.

Note that vibration-damping receiving members 61a made of, e.g., rubber or resin are interposed between the pressing member 40 and the dust-proof filter 33. On the other hand, vibration-damping receiving members 61b made of rubber and the like are interposed between the piezoelectric devices 34a, 34b disposed on the back face-side outer periphery of the dust-proof filter 33 and the dust-proof filter receiving portion 38c, so as to be located at positions substantially symmetrical with respect to the optical axis. The receiving members 61b hold the dust-proof filter 33 so as not to interfere with the vibration of the dust-proof filter 33.

The position of the dust-proof filter 33 in the Y direction is determined by supporting the dust-proof filter 33 by a Z-direction flexed portion of the pressing member 40 through a supporting member 63. On the other hand, the position of the dust-proof filter 33 in the X direction is determined by supporting the dust-proof filter 33 by a supporting portion 38d provided to the holder 38. The supporting member 63 is also made of vibration-damping material such as rubber or resin so as not to interfere with the vibration of the dust-proof filter 33.

When the receiving members 61a, 61b are disposed at positions of nodes of vibration (to be described later) generated in the dust-proof filter 33, the receiving members hardly interfere with the vibration of the dust-proof filter 33. As a result, a highly-efficient dust-proof filter can be configured. In addition, a sealing member 62 as a sealing structure portion having an elastic deformable ring-shaped lip portion is arranged between a peripheral part of the dust-proof filter 33 and the dust-proof filter receiving portion 38c, which ensures an airtight state of the opening 38a including a light beam-transmitting area Ea as a light-transmitting portion through which image-forming light beam having a width of Ex corresponding to an image pickup area passes. The image pickup unit 30 is thus configured to have an airtight structure including the holder 38 formed in a desired size for mounting the CCD 31. The airtight state in the present embodiment is sufficient if the airtight state is at a level capable of preventing reflection of intruded dust on a photographed image and influence on the photographed image to be caused by the dust, and the airtight state is not necessarily at a level capable of completely preventing gas intrusion.

Furthermore, a connection FPC 64 configured of a flexible printed circuit is electrically connected to an end portion of the piezoelectric device 34a as a vibration member for vibration application. Electric signals from the dust-proof filter controlling circuit 48 are inputted to the piezoelectric device 34a to generate predetermined vibration in the piezoelectric device 34a. Since the connection FPC 64 is made of resin, copper foil, and the like, and has flexibility, the connection FPC 64 hardly damps the vibration of the piezoelectric device 34a. Furthermore, by providing the connection FPC 64 at a position where amplitude of vibration is small (the position of the node of vibration, to be described later), damping of the vibration can be further restrained.

When the camera has a camera-shake correction mechanism, to be described later, the piezoelectric device 34a moves relative to the body unit 100. Accordingly, when the dust-proof filter controlling circuit 48 is located in the fixing member which is integrated with the body unit 100, the connection FPC 64 is deformed and displaced according to the operation of the camera-shake correction mechanism. In the present embodiment, the connection FPC 64 is effective due to its flexibility and thinness. In the present embodiment, in particular, the connection FPC 64 is simply configured to be connected to the piezoelectric device 34a at only one point. Therefore, such a connection FPC 64 is best suited for a camera having camera-shake correction mechanism.

Dust detached from the surface of the dust-proof filter 33 falls to the lower side of the body unit 100 due to workings of the inertia force of the vibration and the gravity force, as will be described later. In the present embodiment, a holding member 66 made of sticky material, sticky tape, and the like is disposed on a board 38e provided just proximal to the downside of the dust-proof filter 33 so as to surely hold the fallen dust and prevent the fallen dust from adhering again to the surface of the dust-proof filter 33. By generating vibration so that dust is collected immediately below the dust-proof filter 33 and arranging the holding member 66 immediately below the dust-proof filter 33 as described above, the present embodiment can provide an advantage of preventing failure of other mechanisms in the body unit 100 caused by dispersal of the dust.

Next, the camera-shake correction mechanism in the camera according to the present embodiment will be briefly described. In the camera-shake correction in the camera according to the present embodiment, first, camera-shake compensation amount is calculated by an anti-vibration controlling circuit 501, based on angular velocity signals from an X-axis gyroscope 502 that detects an angular velocity of camera shake around the X-axis of the camera and a Y-axis gyroscope 503 that detects an angular velocity of camera shake around the Y-axis of the camera. When the direction of the photographing optical axis is a Z-axis direction, the CCD 31 as an image pickup device (image forming element) is displaced and moved in an X-axis direction as a first direction and a Y-axis direction as a second direction, which are perpendicular to each other on the XY plane perpendicular to the photographing optical axis, such that the camera shake is compensated, thereby eliminating the influence caused by camera shake. An anti-vibration unit including a driving apparatus for camera-shake correction uses, as drive sources, an X-axis actuator 506 that drives the CCD 31 in the X-axis direction by input of a predetermined drive signal and a Y-axis actuator 507 that drives the CCD 31 in the Y-axis direction by input of a predetermined drive signal, and a Y-frame 530 (in other words, the holder 38 in FIG. 2) to which the CCD 31 is mounted in the image pickup unit 30 is set as an object to be moved. In the present embodiment, the X-axis actuator 506 and the Y-axis actuator 507 are drive sources that drive an X frame 530 and the Y-axis frame 530 in the X direction and the Y direction, respectively. A motor combining an electromagnetic rotary motor, a screw feed mechanism, and the like, or a straight drive electromagnetic motor, a straight drive piezoelectric motor using a voice coil motor, or the like are used as the actuators.

Figure 5:
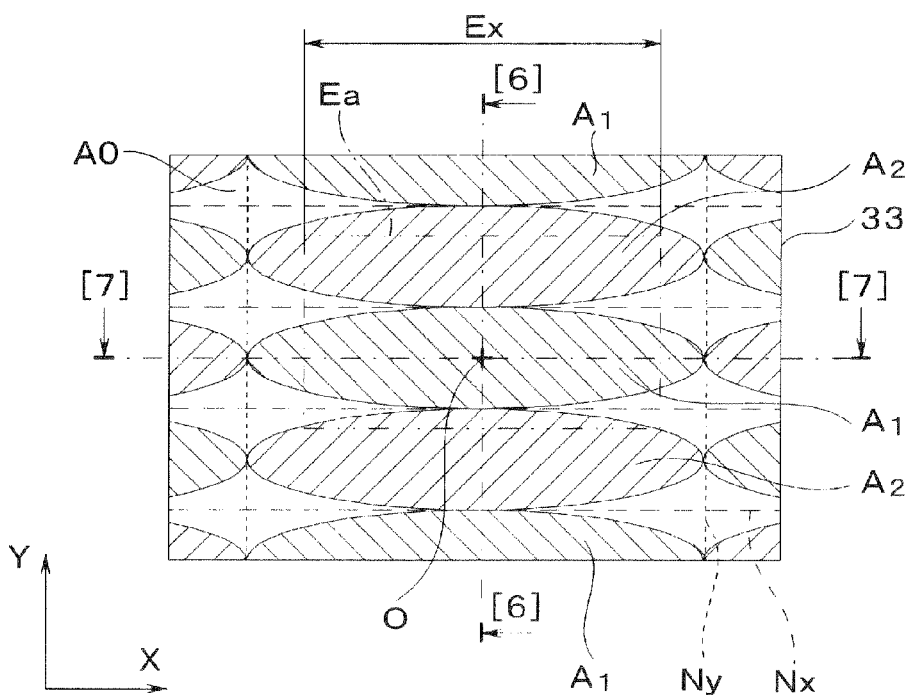
FIG. 5 is a front view showing vibration of a dust-proof filter in the camera in FIG. 1.
Figure 7:
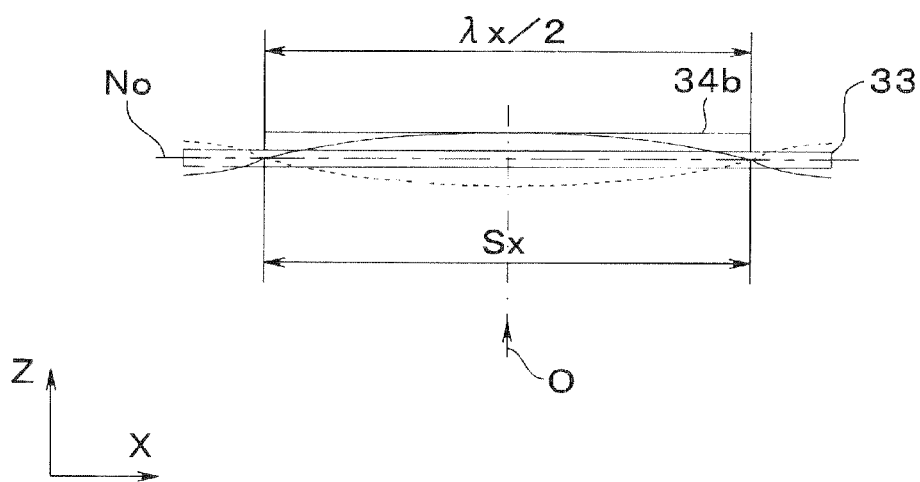
FIG. 7 is a cross-sectional view taken along the line [7]-[7] of FIG. 5.

Now more detailed description will be made on the dust-proof mechanism of the image pickup unit 30 with reference to FIGS. 4 to 8. As described above, FIG. 4 is an exploded perspective view of the dust-proof filter and the piezoelectric devices configuring a dust-proof transducer in the image pickup unit 30. FIG. 5 is a front view of the dust-proof filter, which shows the state of the vibration generated in the dust-proof filter. FIG. 6 is a cross-sectional view taken along the line [6]-[6] in FIG. 5, which is a concept view showing a traveling wave generated in the dust-proof filter. FIG. 7 is a cross-sectional view taken along the line [7]-[7] of FIG. 5. FIG. 8 is a view showing the state of the vibration by enlarging the cross section taken along the line [6]-[6] in FIG. 5.

The dust-proof filter 33 formed by a glass plate has a circular or polygonal plate-like shape as a whole. At least a region which expands to some extent from the center of the dust-proof filter 33 in a radial direction is formed as a transparent portion. The transparent portion is arranged so as to face the front face side of the optical LPF 32 with a predetermined distance.

The piezoelectric device 34a, which is a predetermined vibration member for vibration application for applying vibration to the dust-proof filter 33, is disposed, with the longitudinal direction being the X direction, on the upper side periphery in the Y direction of one surface (on the back face side in the Z direction in the present embodiment) of the dust-proof filter 33, by means of pasting such as adhesive. Furthermore, the piezoelectric device 34b, which is a vibration member for vibration absorption for absorbing a part of vibration applied to the dust-proof filter 33, is disposed, with the longitudinal direction being the X direction, on the lower side periphery in the Y direction of the dust-proof filter 33 similarly by means of pasting such as adhesive. Note that in FIGS. 6 and 7, the widths in the Y direction and the lengths in the X direction of the piezoelectric devices 34a, 34b are shown by Sy and Sx, respectively.

The dust-proof transducer 65, which is configured by disposing the piezoelectric devices 34a, 34b on the dust-proof filter 33, resonantly vibrates when a voltage with a predetermined frequency is applied to the piezoelectric device 34a, and generates flexing vibration shown in FIGS. 5, 6 and 7. As shown in FIG. 4, on the piezoelectric device 34a are formed a signal electrode S34a1, and a signal electrode G34a2 which is provided on the rear surface at a position opposed to the signal electrode S34a1 and drawn, through the side surface, to the surface on which the signal electrode S34a1 is formed. The piezoelectric device 34a is connected with the connection FPC 64 having a conductive pattern which is electrically connected to the signal electrode S34a1 and the signal electrode G34a2.

The dust-proof filter controlling circuit 48 which is connected to the electrodes through the FPC 64 applies a driving voltage having a predetermined cycle to the dust-proof filter 33, thereby capable of generating two-dimensional standing-wave flexing vibration as shown in FIGS. 5, 6 and 7, in the dust-proof filter 33.

The flexing vibration shown in FIGS. 5, 6 and 7 show the standing-wave vibration generated when the piezoelectric device 34a polarized in a thickness direction (Z direction) and the piezoelectric device 34b which is a non-polarized non-piezoelectric ceramic are pasted on the dust-proof filter 33. Note that the center line N0 in FIG. 6 represents a line on the neutral plane of the dust-proof filter 33.

In FIG. 5, lines Nx and Ny represent the nodes of vibration. No vibration amplitude occurs on these lines. A region A0 is within a range where the nodes of vibration intersect with each other and is a region where almost no vibration amplitude occurs. Regions A1 and A2 show vibration regions which deform to the front face side in a convex shape or in a concave shape. In this standing-wave state, the dust adhered to the area where almost no vibration occurs cannot be removed by the flexing vibration.

Accordingly, in the present embodiment, in addition to the state where the standing-wave flexing vibration is generated as shown in FIG. 5, a traveling flexing wave is generated in the dust-proof filter 33 by disposing at a predetermined position on the dust-proof filter 33 the piezoelectric device 34b polarized in the thickness direction (Z direction) and causing the piezoelectric device 34b to absorb the predetermined vibration in the standing-wave flexing vibration and discharge the generated electric charge. The traveling flexing wave can detach the dust adhered to the light beam-transmitting area Ea, through which the image-forming light beam passes, of the dust-proof filter 33, by the inertia force generated in the dust.

Next, detailed description will be made on the method of generating a traveling wave with reference to FIG. 8. FIG. 8 shows the same cross section as one along the line [6]-[6] in FIG. 5, and the vibration state is the same as the state where the piezoelectric device 34b is not polarized (same as the state shown in FIG. 5). When a voltage with a predetermined frequency f is applied to the piezoelectric device 34a, the dust-proof transducer 65 including the dust-proof filter 33 becomes a state shown by the solid line at a certain time point t0.

When the angle velocity of the voltage with the above-described frequency is defined as $\omega$, the amplitude in the Z direction as A, and the wavelength of the flexing vibration as $\lambda$, and the equation $Y=2\pi y/\lambda$ is satisfied, the vibration z (Y, t), which is the vibration in the Z direction at a certain mass point Y1 located at an arbitrary position y on the surface of the transducer at an arbitrary time t, is expressed by the following equation.

$$z(Y,t)=A\times\sin(y)\times\cos(\omega t) \quad (1)$$

The equation (1) represents the waveform of the standing-wave vibration in FIGS. 5, 6, and 7. Note that, since the wavelength $\lambda$ is the wavelength in the Y direction, the wavelength $\lambda$ is shown as $\lambda y$ in the drawings.

That is, when the equation $y=n\cdot\lambda/2$ is satisfied with n being an integer, Y is given by the equation $Y=n\pi$, and sin(Y) is zero. Accordingly, the vibration includes the nodes in which the vibration amplitude in the Z direction becomes zero irrespective of time, so that this is standing-wave vibration. The state indicated by the dashed lines in FIG. 8 shows the vibration at the time expressed by t=kπ/ω (k is an odd number), the phase of which is reversed from the phase of the vibration at the time t0.

On the other hand, when the piezoelectric device 34b as a vibration absorbing body is in a polarized state (state in FIG. 8), the distance H (distance between the centers of the Y-direction width Sy of the piezoelectric devices) between the disposing position of the piezoelectric device 34b and the disposing position of the piezoelectric device 34a is expressed by the following equation.

$$H=k(\lambda/4)$$

Note that the polarized direction of the piezoelectric device 34b is indicated by the arrow PL in FIG. 8. In this case, if H is assumed to be vibration phase, λ is expressed as λ=2π, so that H is given by H=kπ/2. At the timing that the phase advances by π/2 with the vibration phase of the piezoelectric device 34a as reference, the piezoelectric device 34b absorbs the generated vibration to generate an electric charge, and the generated electric charge is flown to the ground.

Similarly as the equation (1), when the vibration of the piezoelectric device 34b is expressed as the vibration zb(Y, t) at an arbitrary position y in the Y direction, and only the case where the equation k=(1+4n) is satisfied with n being an integer is considered, H is given by the following equations.

$$H = k\pi/2$$
$$= (\pi/2 + 2\pi n)$$
$$= \pi/2$$

The above-described vibration zb(Y, t) is given by the following equation (the state shown in FIG. 8).

$$zb(Y,t)=\sin(Y+\pi/2)\times\cos(\omega t+\pi/2) \quad (2)$$

Incidentally, k is an odd number, and k is expressed by the equation: k=(3+4n) when k is not expressed by the equation: k=(1+4n), and H is expressed as H=3π+2.
This state can be achieved only by shifting the disposing position of the piezoelectric device 34b by λ/2.

The equation (1) represents the vibration z(Y, t) generated by the piezoelectric device 34a. If the vibration zb(Y, t) represented by the equation (2) is subtracted from the z(Y, t), combined vibration Z(Y, t) expressed by the following equation is obtained.

$$Z(Y,t)=z(Y,t)-zb(Y,t)$$

As a result, the following equations are obtained.

$$Z(Y, t) = \sin(Y)\times\cos(\omega t) - \sin(Y+\pi/2)\times\cos(\omega t - \pi/2) \quad (3)$$
$$= \sin(Y)\times\cos(\omega t) - \cos(Y)\times\sin(\omega t)$$
$$= \sin(Y - \omega t) \quad (4)$$

The equation (4) expresses the traveling wave.

Here, the time phase can be shifted as follows. If the frequency of the input signal of the dust-proof filter controlling circuit 48 is shifted from the frequency at which the standing wave with maximum amplitude (standing wave at the resonant frequency) is generated in the dust-proof transducer 65, the phase of the voltage signal (indicating the generation of electric charge) generated in the piezoelectric device 34b is also shifted. Accordingly, the time phase can be shifted by setting the frequency applied to the piezoelectric device 34a to a predetermined value. The advancing direction of the traveling wave expressed by the equation (4) is the positive direction of the Y direction, that is, the Wy direction shown in FIG. 8. At this time, elliptic vibration occurs at the mass point Y0 on the surface of the dust-proof filter 33 as shown in FIG. 8 (see the reference character EL in FIG. 8). In FIG. 8, the dust adhered to the dust-proof filter receives downward inertia force, so that the force to detach the dust becomes stronger by being combined with the force acting in the gravitational direction. In addition, in FIG. 8, as shown by the reference character EC, the electric charge generated in the piezoelectric device 34b is positively flown to the ground. However, both positive and negative electric charges are cyclically generated and flown through inside the signal electrode S34b1 and the signal electrode G34b2 to be annihilated, so that the piezoelectric device 34b is not necessarily connected to the ground of the circuit. The traveling direction of the traveling wave can be changed by shifting the positional phase Y by π (that is, shifting the distance H by λ) to reverse the phase, or by shifting the time phase ωt by π.

Figure 9:
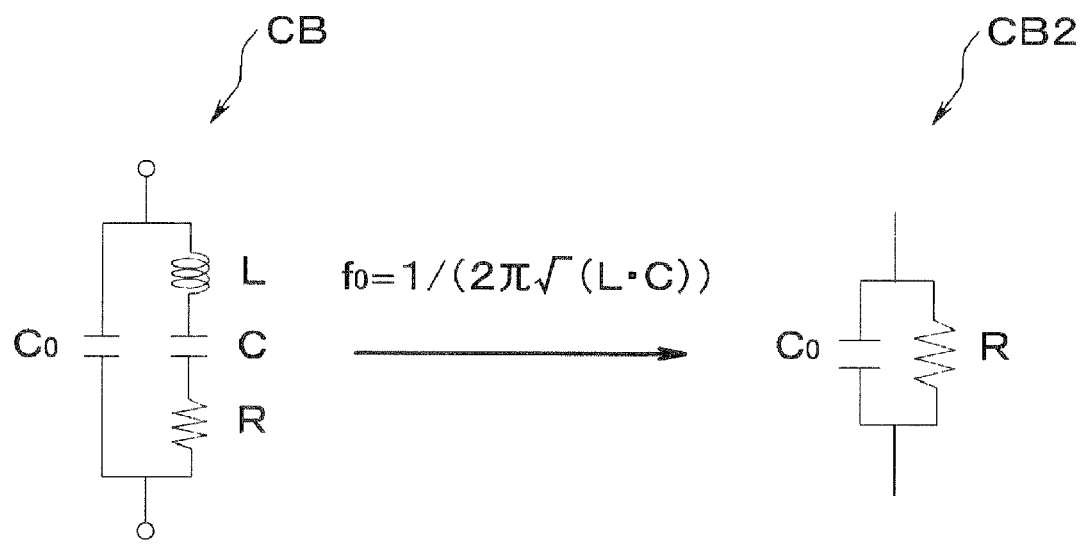
FIG. 9 is a view showing an electric equivalent circuit of a piezoelectric device for vibration absorption of the dust-proof filter in the camera in FIG. 1.

Next, description will be made on the vibration state in a case where the frequency of the piezoelectric device 34b is changed around the resonant frequency using the electric equivalent circuit of the piezoelectric device 34b as a vibration absorbing body in FIG. 9. Around the resonant frequency of the dust-proof transducer 65, the electric equivalent circuit of the piezoelectric device 34b is shown by the reference character CB in FIG. 9. The reference character C0 in FIG. 9 represents the capacitance inherently possessed by the piezoelectric device 34b. The reference characters L, C and R represent values in the equivalent circuit in a case where the mechanical vibration by the piezoelectric device is replaced by electric vibration of a coil, a capacitor, and a resistance as electric circuit devices. It is needless to say that these values change depending on the frequency.

When the frequency becomes the resonant frequency f0, that is, when the frequency is expressed by the equation f0=1/(2π√(L·C), L and C resonate with each other as shown in the electric equivalent circuit CB2 in FIG. 9. If the frequency is increased toward the resonant frequency from a non-resonant frequency, the phase of the piezoelectric device 34b changes with respect to the phase of vibration of the piezoelectric device 34a. At the time of resonance, the phase advances by π/2. If the frequency is further increased, the phase advances up to π. If the frequency is yet further increased, the phase decreases. When the frequency is out of the resonant range, the phases of the piezoelectric devices 34a and 34b become the same. Actually, according to the configuration of the dust-proof transducer 65, an ideal state cannot be obtained and the phase does not change up to π in some cases. However, if the drive frequency is appropriately set, the phase can be set to π/2 or in the vicinity of π/2.

Due to the generation of the above-described traveling wave, the area where vibration amplitude is large as shown in FIG. 5 moves upward, and regions other than those corresponding to the nodes of vibration in the Y direction becomes an area where the vibration amplitude is large. The light beam-transmitting area Ea through which the image-forming light beam having the width Ex passes is sufficiently smaller than the regions, so that dust can be removed from the transmitting area for image-forming light beam. In addition, the nodes of vibration parallel to the Y direction in FIG. 5 remain as nodes, even if a traveling wave is generated. Therefore, if the portions corresponding to the nodes are used for holding the dust-proof filter 33, the dust-proof filter 33 can be securely supported without generation of vibration damping. On the other hand, the sealing member 62 (FIGS. 2, 3) have to be provided in the portions where the traveling wave is generated. However, the sealing member is formed in a lip shape to prevent strong force from acting in the flexing vibration amplitude direction, so that vibration damping caused by the sealing member 62 is extremely low.

Normally, temperature influences the elastic coefficient of the dust-proof transducer 65, and is one factor to change the characteristic frequency of the dust-proof transducer 65. Accordingly, it is preferable to measure the temperature of the dust-proof transducer 65 when using it, and take the characteristic frequency thereof into consideration. In this embodiment, a temperature sensor (not shown) connected to a temperature measuring circuit (not shown) is provided in the body unit 100. Based on the measured temperature by the temperature sensor, a correction value for a predetermined vibration frequency of the dust-proof transducer 65 is stored in the EEPROM 29. The measured temperature and the correction value are read into the Bµcom 50 to calculate a drive frequency, and the calculated drive frequency is set as a drive frequency for the dust-proof filter controlling circuit 48.

Next, description will be made on the driving and control, and operation of the dust-proof filter 33 of the camera equipped with dust-proof function according to the present embodiment, with reference to the circuit diagram of the dust-proof filter controlling circuit 48 shown in FIG. 10, and the time charts shown in FIGS. 11A, 11B, 11C and 11D.

Figure 10:
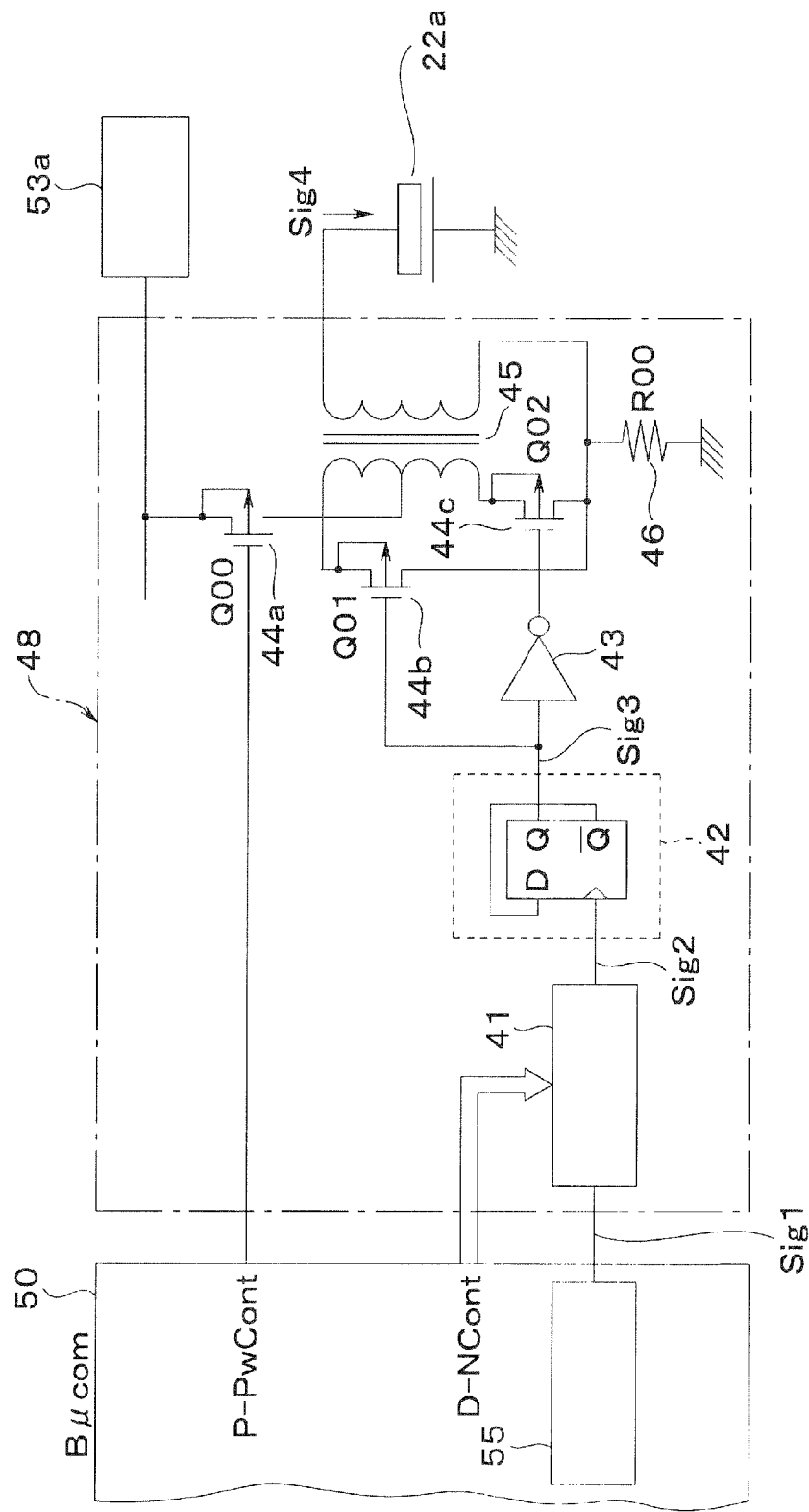
FIG. 10 is a circuit diagram showing a controlling circuit including a dust-proof filter controlling circuit in the camera in FIG. 1.

The dust-proof filter controlling circuit 48 exemplified here has the circuit configuration shown in FIG. 10. In the components in the circuit are generated signals Sig 1, Sig 2, Sig 3 and Sig 4 which have the waveforms shown by the time charts in FIG. 11A, FIG. 11B, FIG. 11C and FIG. 11D, respectively. Based on the signals, the dust-proof filter controlling circuit 48 is controlled as described below.

The dust-proof filter controlling circuit 48, as exemplified in FIG. 10, is configured of a N-ary counter 41, a ½ frequency-dividing circuit 42, an inverter 43, a plurality of MOS transistors (Q00, Q01, Q02) 44a, 44b and 44c, a transformer 45, and a resistance (R00) 46.

On/off switching operations of the transistor (Q01) 44b and the transistor (Q02) 44c which are connected to the primary side of the transformer 45 generate the signal (Sig 4) having a predetermined cycle on the secondary side of the transformer 45. Furthermore, based on the signal (Sig 4) having the predetermined cycle, the piezoelectric device 34a is driven through an electromechanical converter 22a and a part of generated vibration is absorbed by the piezoelectric device 34b, thereby generating a resonant traveling wave in the dust-proof transducer 65 to which the dust-proof filter 33 is fixed.

The Bµcom 50 controls the dust-proof filter controlling circuit 48 as described below through two IO ports, "P-PwCont" and "D-NCnt" (see FIG. 10) which are provided as control ports, and a clock generator 55 which exists inside the Bµcom 50.

The clock generator 55 outputs a pulse signal (basic clock signal) to the N-ary counter 41 at a frequency which is sufficiently more rapid than the signal frequency applied to the piezoelectric device 34a. The output signal is the Sig 1 having the waveform shown by the time chart in FIG. 11A. The basic clock signal is inputted to the N-ary counter 41.

The N-ary counter 41 counts the pulse signal and outputs an end-pulse signal every time the number of the pulse signal reaches a predetermined value "N". That is, the basic clock signal is frequency-divided by N. This output signal is the signal Sig 2 having the waveform shown in the time chart in FIG. 11B. The duty ratio of H (High) to L (Low) of the frequency-divided pulse signal is not 1 to 1. Accordingly, the duty ratio is converted into 1 to 1 by passing the frequency-divided pulse signal through the ½ frequency-dividing circuit 42. Note that the converted pulse signal corresponds to the signal Sig 3 having the waveform shown by the time chart in FIG. 11C.

Figure 11:
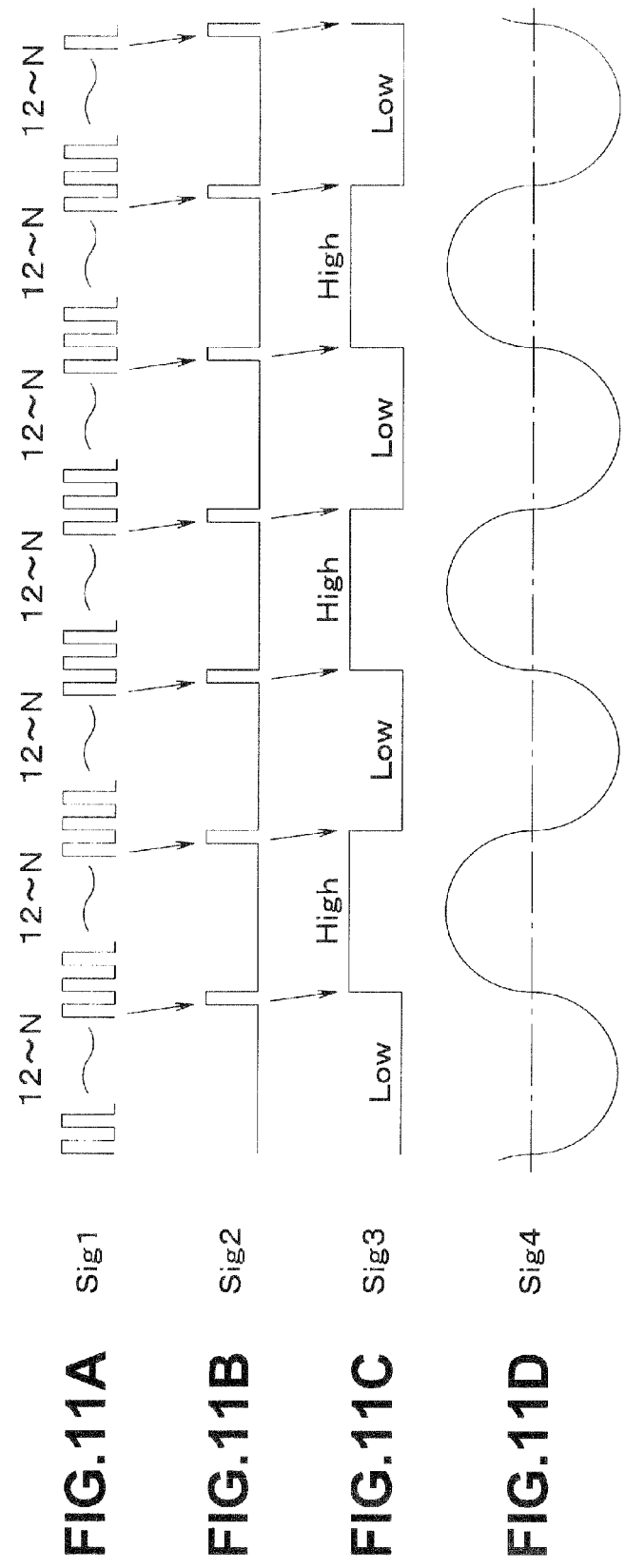
FIG. 11A is a time chart of a signal 1 in the dust-proof filter controlling circuit in the camera in FIG. 1.
FIG. 11B is a time chart of a signal 2 in the dust-proof filter controlling circuit in the camera in FIG. 1.
FIG. 11C is a time chart of a signal 3 in the dust-proof filter controlling circuit in the camera in FIG. 1.
FIG. 11D is a time chart of a signal 4 in the dust-proof filter controlling circuit in the camera in FIG. 1.

When the converted pulse signal is in the high state, the MOS transistor (Q01) 44b which receives this pulse signal is turned on. On the other hand, the pulse signal is applied to the transistor (Q02) 44c via the inverter 43. Therefore, when the pulse signal is in the low state, the transistor (Q02) which receives this pulse signal is turned on. If the transistor (Q01) 44b and the transistor (Q02) 44c, which are connected to the primary side of the transformer 45, are alternatively turned on, a signal having a cycle similar to that of the signal Sig 4 in FIG. 11D is generated on the secondary side.

The winding ratio of the transformer 45 is determined depending on the output voltage of the unit of the power supply circuit 53 and the voltage required for driving the piezoelectric device 34a. Note that the resistance (R00) 46 is provided for preventing the excessive current from flowing to the transformer 45.

When the piezoelectric device 34a is driven, it is required that the transistor (Q00) 44a is turned on and a voltage is applied to the center tap of the transformer 45 from the unit of the power supply circuit 53. The on/off control of the transistor (Q00) 44a is performed through the "P-PwCont" which is the IO port. The setting value "N" of the N-ary counter 41 can be set by the "D-NCnt" which is the IO port. The Bµcom 50 can arbitrarily change the drive frequency of the piezoelectric device 34a by appropriately controlling the setting value "N".

At this time, the frequency can be calculated based on the equation below. That is, when the setting value of the counter is defined as N, the frequency of the output pulse of the clock generator as fpls, and the frequency of the signal applied to the piezoelectric device 34a as fdrv, fdrv can be obtained based on the following equation.

$$fdrv = fpls/2N \qquad (5)$$

The calculation based on the equation (5) is performed by a CPU as a controlling section of the Bµcom 50.

Furthermore, the camera has a display portion for informing a camera user of the operation of the dust-proof filter 33 in a case where the dust-proof filter 33 is vibrated at the frequency within the ultrasonic range (frequency which is equal to or higher than 20 kHz). That is, when applying vibration by the piezoelectric device 34a as vibration-applying means to the dust-proof filter 33, as a translucent vibratable member to be vibrated, which is arranged in front of the image pickup unit 30, the digital camera of the present embodiment activates the display portion of the camera in conjunction with the operation of the driving circuit of the vibration-applying means and informs the user of the operation of the dust-proof filter 33 (to be detailed later).

In order to describe the above characteristics, a specific photographing sequence performed by the Bµcom 50 as a body controlling microcomputer is described with reference to FIGS. 12, 13 and 14.

Figure 12:
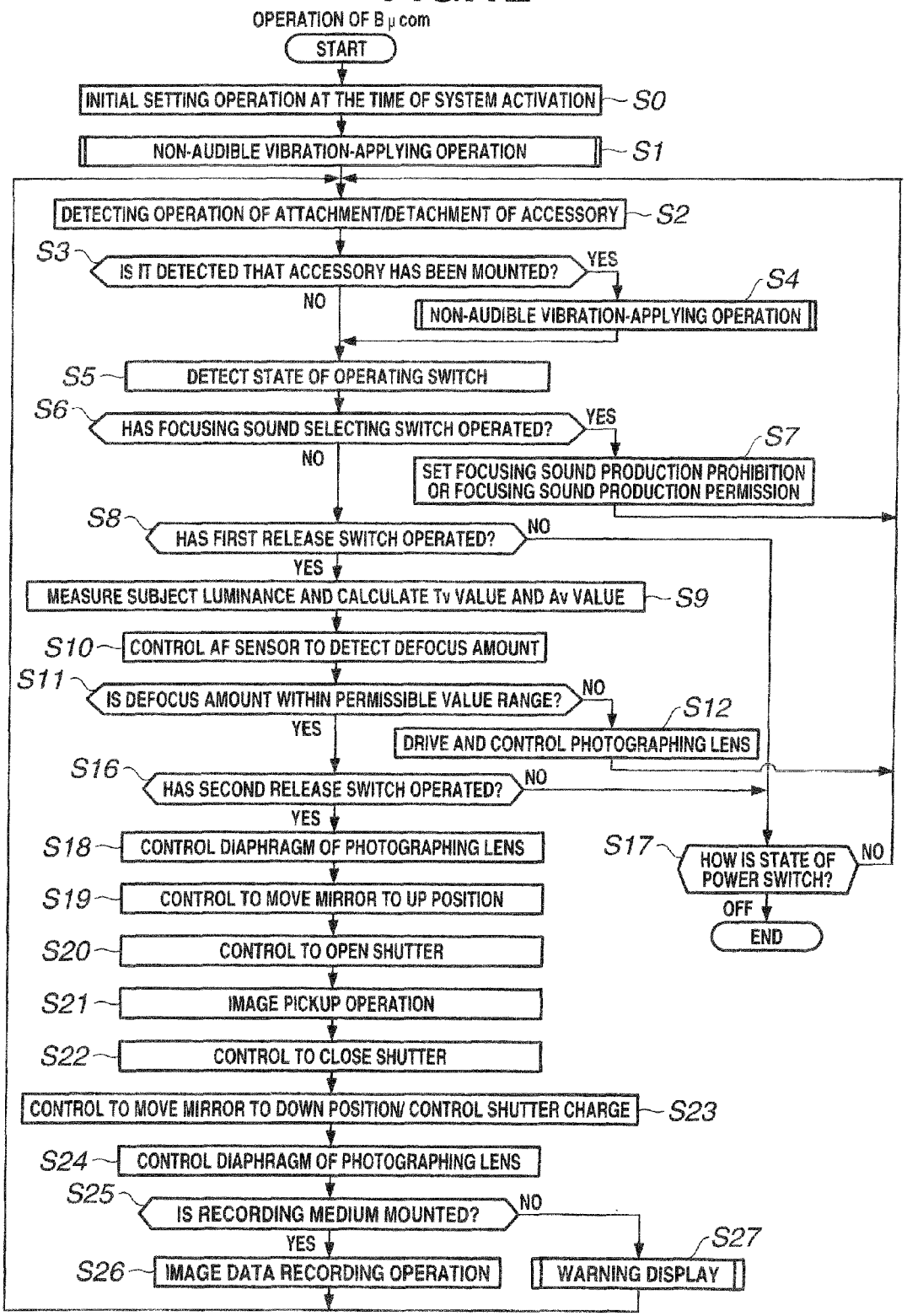
FIG. 12 is a flowchart of a photographing sequence of the controlling circuit in the camera in FIG. 1.

FIG. 12 is a flowchart of the photographing sequence in the camera of the present embodiment and shows the photographing sequence (main routine) performed by the Bµcom 50. FIGS. 13 and 14 are subroutines invoked in the main routine. FIG. 13 is a flowchart of "non-audible vibration-applying operation". FIG. 14 is a flowchart of "display operation" associated with the vibration-applying operation in FIG. 13.

The control program executable by the Bμcom 50 in the flowchart in FIG. 12 starts to be executed when the power supply switch (not shown) of the body unit 100 of the camera is turned on.

First, in step S0, processing to activate the camera system is performed. The power supply circuit 53 is controlled to supply power to each circuit unit configuring the camera system. In addition, initial setting of each unit is performed.

In step S1, by calling up the subroutine "non-audible vibration-applying operation" (see FIG. 13) to be described later, the dust-proof filter 33 is vibrated in a non-audible manner, that is, outside the audible range. Note that the audible range in the present embodiment is within the frequency of about 20 Hz to 20000 Hz, with audibility of ordinary people as reference.

The subsequent steps S2 to S27 are a step group which is performed cyclically. The step S2 is a step for detecting attachment/detachment of an accessory to and from the camera. For example, in the attachment/detachment detecting operation for detecting whether the lens unit 10 as an accessory has been mounted to the body unit 100, the attachment/detachment state of the lens unit 10 is checked by communication with the Lμcom 50.

If, in step S3, it is detected that a predetermined accessory has been mounted to the camera main body, in step S4, the dust-proof filter 33 is vibrated in a non-audible manner by calling up the subroutine "non-audible vibration-applying operation" to be described later.

When the accessory, in particular, the lens unit 10 is not mounted to the body unit 100 as the camera main body, it is more likely that dust adheres particularly to each of the lenses and the dust-proof filter 33. It is thus effective to perform dust removing operation at the timing of detection of the mounting of the lens unit 10, as described above. In addition, at the time of lens replacement, air is circulated and dust is likely to enter and adhere to inside the camera, so that it is meaningful to remove dust at the time of lens replacement. Then, the status is regarded as immediately before the photographing and the routine moves on to step S5.

On the other hand, in the step S3, it is detected that the lens unit 10 is detached from the body unit 100, the routine skips step S4 to move on to the next step S5. In the step S5, detection is made on the states of the predetermined operating switches included in the camera.

In step S8, it is determined whether or not a first release SW (not shown) configuring a first stage release switch is operated, based on the on/off state of the release SW. The state of the first release switch is read, and if the first release SW is not turned on for over a predetermined time period, the routine moves on to the step S17 to be described later to terminate the processing (sleep and the like).

On the other hand, the first release SW has been turned on, luminance information of a subject is obtained from the photometer circuit 21 in step S9. Based on the luminance information, an exposure time (Tv value) of the CCD unit 27 and the diaphragm setting value (Av value) of the lens unit 10 are calculated.

After that, in step S10, detection data of the AF sensor unit 16 is obtained via the AF sensor driving circuit 17. Based on the data, defocus amount is calculated.

In step S11, it is determined whether or not the calculated defocus amount is within a permissible range. When it is determined that the defocus amount is not within the permissible range, the photographing lens is driven and controlled in step S12, and the routine returns to step S2.

Furthermore, in step S16, it is determined whether or not a second release SW (not shown) configuring a second stage release switch has been turned on. When the second release SW is in the on-state, the routine moves on to the subsequent step S18 and a predetermined photographing operation (to be detailed later) is started. On the other hand, the second release SW is in the off-state, the routine moves on to step S17 to terminate the processing.

Note that, during the image pickup operation, as usual, electronic image pickup operation is controlled to be performed in the time period corresponding to a predetermined speed for exposure (exposure speed).

As the above-described photographing operation, in the steps S18 to S24, a subject image is picked up in a predetermined order. First, the Av value is transmitted to the Lμcom 5 and an instruction is given to the L Lμcom 5 to drive the diaphragm 3 (step S18), and the quick return mirror 11 is moved to an UP position (step S19). Then front curtain running of the shutter 15 is started to perform shutter opening control (step S20), instruction to perform "image pickup operation" is given to the image processing controller 28 (step S21). When exposure (image pickup) to the CCD 31 for the time period indicated by the Tv value is finished, rear curtain running of the shutter 15 is started to perform shutter closing (CLOSE) control (step S22). Then non-audible vibration-applying operation is terminated. Then, the quick return minor 11 is driven and moved to DOWN position, and charging operation of the shutter 15 is performed (step S23).

After that, an instruction is given to the Lμcom 5 to return the diaphragm 3 to the opening position (step S24), a series of image pickup operation is terminated.

Subsequently, in step S25, it is detected whether or not the recording medium 27 is mounted to the body unit 100. When the recording medium 27 is not mounted, warning is displayed in step S27. Then, the routine moves on again to the above-described step S2, and the same series of processings are repeated.

On the other hand, the recording medium 27 is mounted, in step S26, an instruction is given to the image processing controller 28 to record the photographed image data in the recording medium 27. When the recording operation of the image data is terminated, the routine moves on again to the step S2, and the same series of processings are repeated.

Description will now be made on control procedures of the above-described three subroutines in association with the relationship between the detailed vibration configuration and the display operation in the vibration-applying operation, with reference to FIGS. 13, 14 and 15. Note that the vibration configuration is a configuration of the vibration generated by the vibration-applying means.

Figure 13:
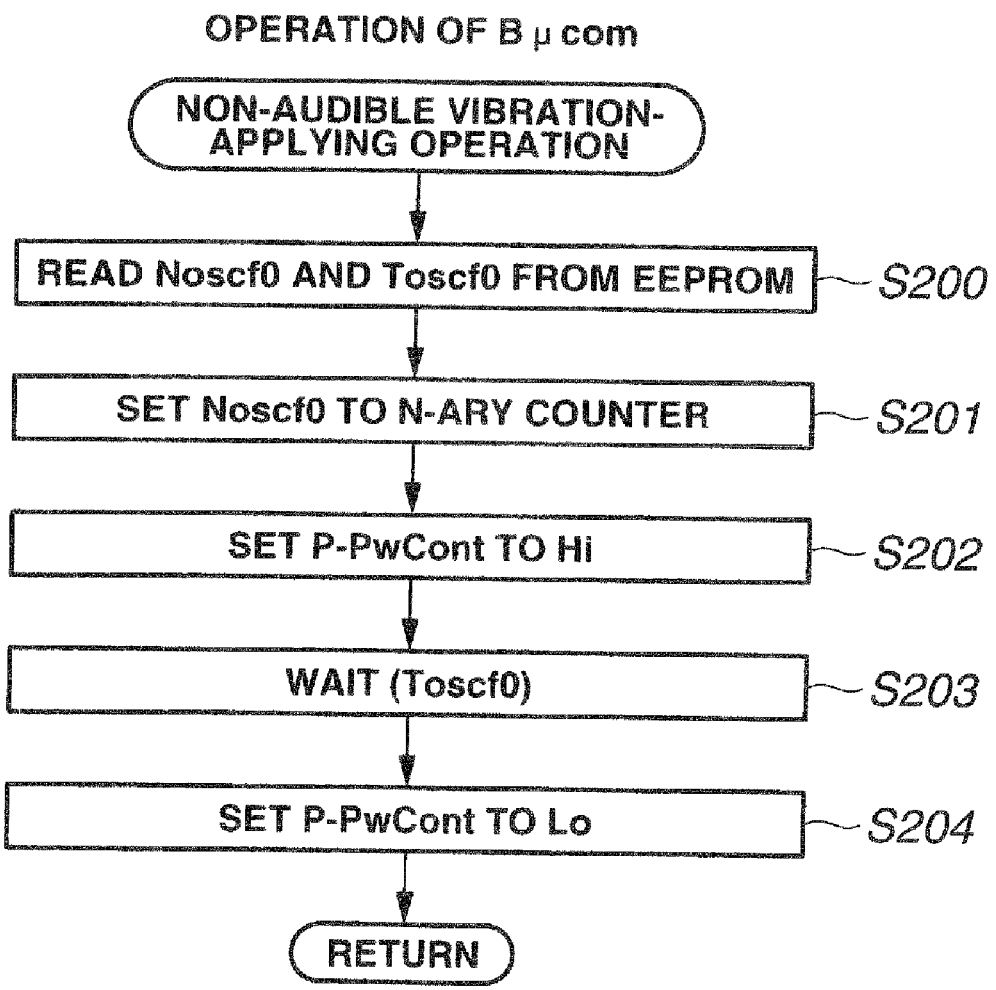
FIG. 13 is a flowchart of non-audible vibration-applying operation in the dust-proof filter control as a subroutine invoked in the photographing sequence in FIG. 12.

FIG. 13 is a flowchart of the subroutine "non-audible vibration-applying operation". FIG. 14 is a flowchart of "display operation" associated with the vibration-applying operation in FIG. 13. FIG. 15 is a view showing the waveform of the resonant frequency continuously supplied to the vibration-applying means in the non-audible vibration-applying operation.

Figure 14:
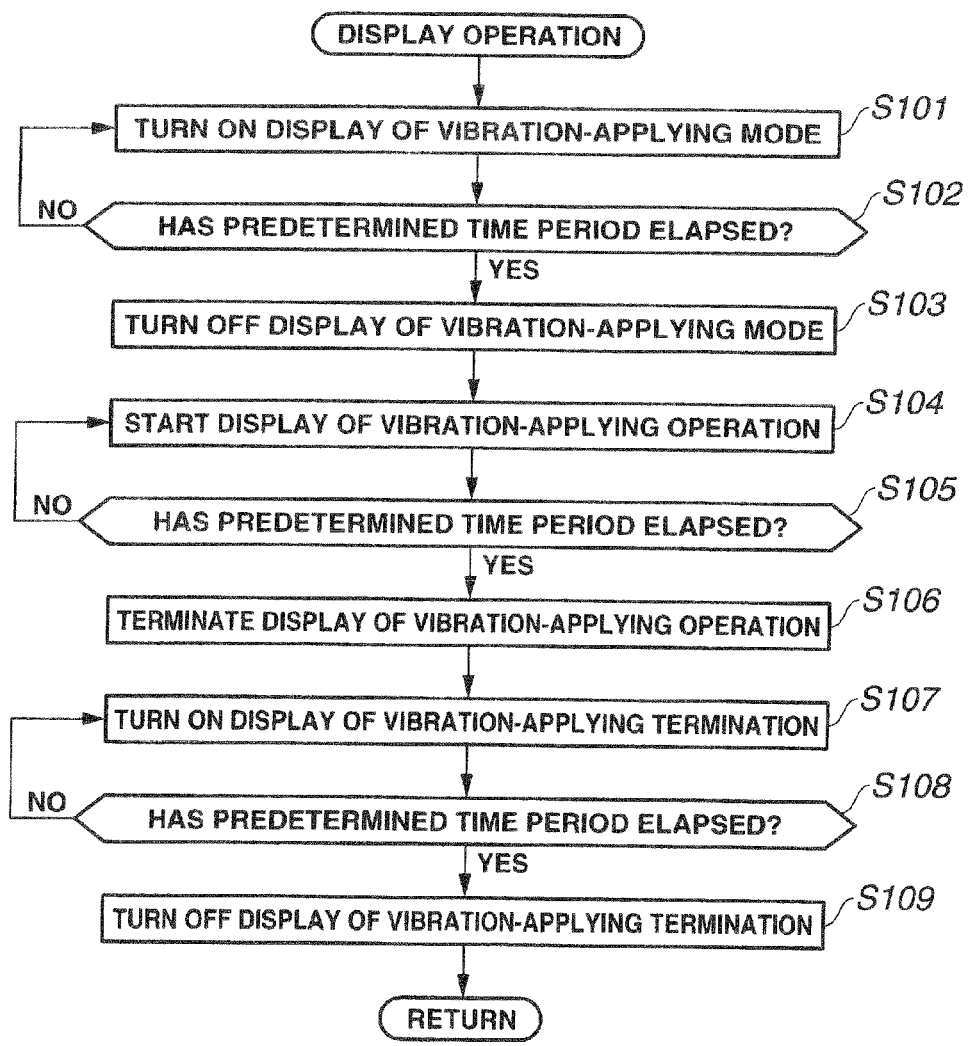
FIG. 14 is a flowchart of display operation in the dust-proof filter control as a subroutine invoked in the photographing sequence in FIG. 12.

Since the subroutine "non-audible vibration-applying operation" in FIG. 13 and the subroutine "display operation" associated with the vibration-applying operation in FIG. 14 are intended for the vibration-applying operation performed only for removing the dust of the dust-proof filter 33, the vibration frequency f0 is set to a predetermined frequency around the resonant frequency of the dust-proof filter 33. For example, the vibration frequency is set to 80 kHz in the present embodiment. Since the vibration frequency is at least higher than 20 kHz, the vibration is non-audible for the user.

First, in step S200, data related to a driving time period (Toscf0) during which the dust-proof filter 33 is vibrated and a driving frequency (Noscf0) as the resonant frequency is read from a predetermined storage area of the EEPROM 29. At this timing, in step S101, display of a vibration-applying mode is turned on. Next, in step S102, it is determined whether or not a predetermined time period has elapsed. When it is determined that the predetermined time period has not elapsed, the display of the vibration-applying mode is continued. After the predetermined time period has elapsed, in step S103, the display of the vibration-applying mode is turned off.

On the other hand, in step S201, the driving frequency Noscf0 is outputted from the output port "D-NCnt" of the Bμcom 50 to the N-ary counter 41 of the dust-proof filter controlling circuit 48.

In the subsequent steps S202 to step S204, dust removing operation is performed as follows. That is, first, the dust removing operation starts to be executed. Meanwhile, in the display operation at this time, the display of the vibration-applying operation is started (step S104) at the timing that a control flag of the "P-PwCont" is set to Hi (High Value). Next, in step S105, it is determined whether or not a predetermined time period has elapsed. When it is determined that the predetermined time period has not elapsed, the display of the vibration-applying operation is continued. After the predetermined time period has elapsed, the display of the vibration-applying operation is terminated (step S106). The display of the vibration-applying operation at this time changes (not shown) depending on elapse of time period or the state of dust removal. The predetermined time period in this case is approximately equal to Toscf0 which is duration of vibration-applying operation, to be described later. In addition, when the control flag of the "P-PwCont" is set to Hi for dust removal (step S202), the piezoelectric device 34a applies vibration to the dust-proof filter 33 at the predetermined driving frequency (Noscf0) to shake off the dust adhered to the filter surface. When the dust adhered to the dust-proof filter surface is shaken off by the dust removing operation, aerial vibration occurs at the same time and ultrasound is generated. However, even if the dust-proof filter is driven at the driving frequency Noscf0, the sound is out of the audible range of ordinary people, so that ordinary people cannot hear the sound.

During the predetermined driving time period (Toscf0), wait state continues with the dust-proof filter 33 vibrated (step S203). After the predetermined driving time period (Toscf0) elapsed, the control flag of "P-PwCont" is set to Lo (Low value), and the display of vibration-applying termination is turned on (step S107) and dust removing operation is stopped (step S204). After the predetermined time period has elapsed (step S108), the display of the vibration-applying termination is turned off (step S109), and the display is terminated. Then, the routine returns to the next step of the step called up in the main routine.

Figure 15:
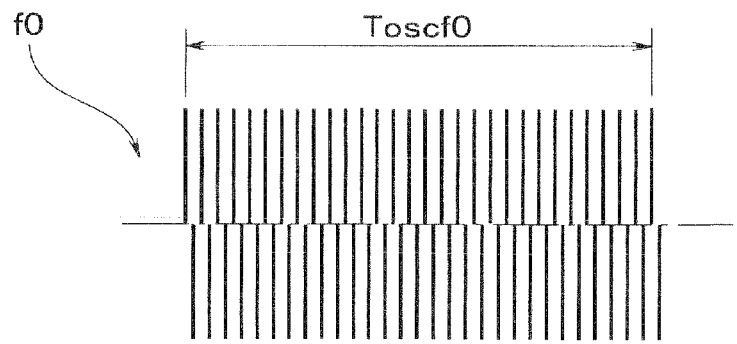
FIG. 15 is a view showing an output signal of the dust-proof filter controlling circuit in the camera in FIG. 1.

The vibration frequency f0 (Noscf0) as the resonant frequency and the driving time period (Toscf0), which are applied in the subroutine, are indicated by the waveform shown in FIG. 15. That is, the waveform is a continuous waveform in which constant vibration (f0=40 kHz) continues over the time period (Toscf0) sufficient for dust removal. With this configuration of vibration, the resonant frequency to be supplied to the vibration-applying means is adjusted and controlled.

As described above, the digital camera according to the present embodiment uses the dust-proof filter 33 which occupies a small space and has a simple configuration, to generate ultrasonic vibration including a uniform traveling wave in a range which needs dust proof. Such a digital camera is capable of highly efficiently preventing dust from adhering to the CCD 31 and also preventing dust from being reflected on the CCD 31.

In addition, the unit, which is configured of the dust-proof mechanism including the dust-proof filter and the controlling circuit for the dust-proof mechanism, applied to the camera of the present embodiment can be applied also as a dust-proof unit for a liquid crystal panel of a video apparatus such as a liquid crystal projector. Such a unit is capable of efficiently preventing dust from being reflected on a screen surface.

Figure 17:
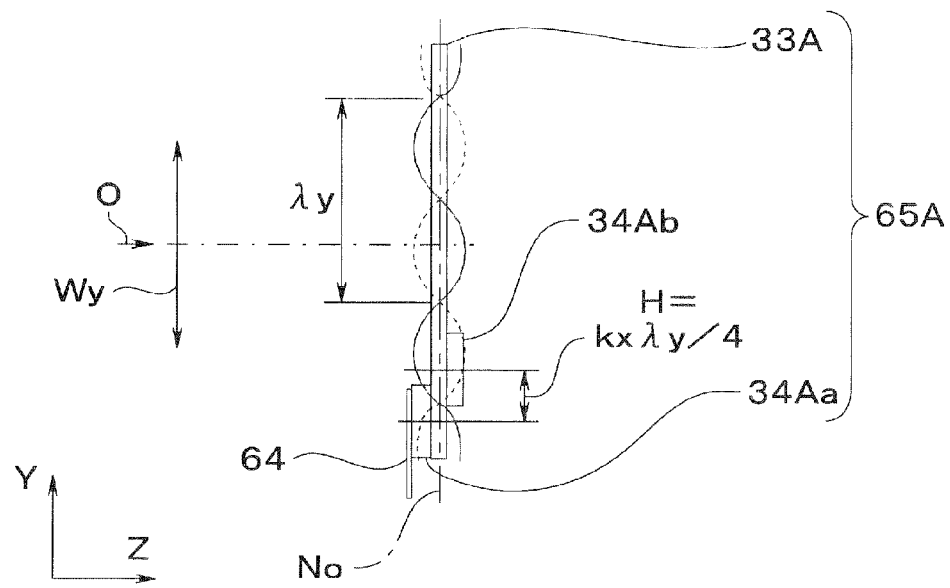
FIG. 17 is a cross-sectional view taken along the line [17]-[17] of FIG. 16.
Figure 18:
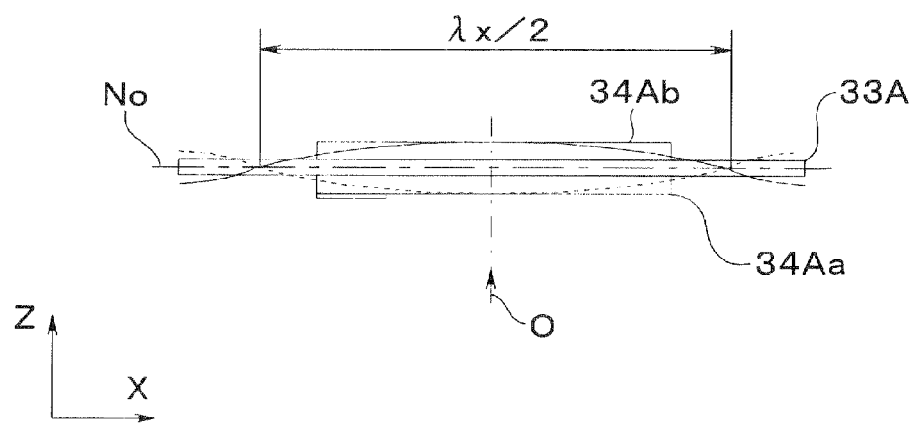
FIG. 18 is a cross-sectional view taken along the line [18]-[18] of FIG. 16.

Next, as a second embodiment of the present invention, a dust-proof mechanism including a dust-proof filter applicable to a digital camera will be described with reference to FIGS. 16, 17 and 18.

Figure 16:
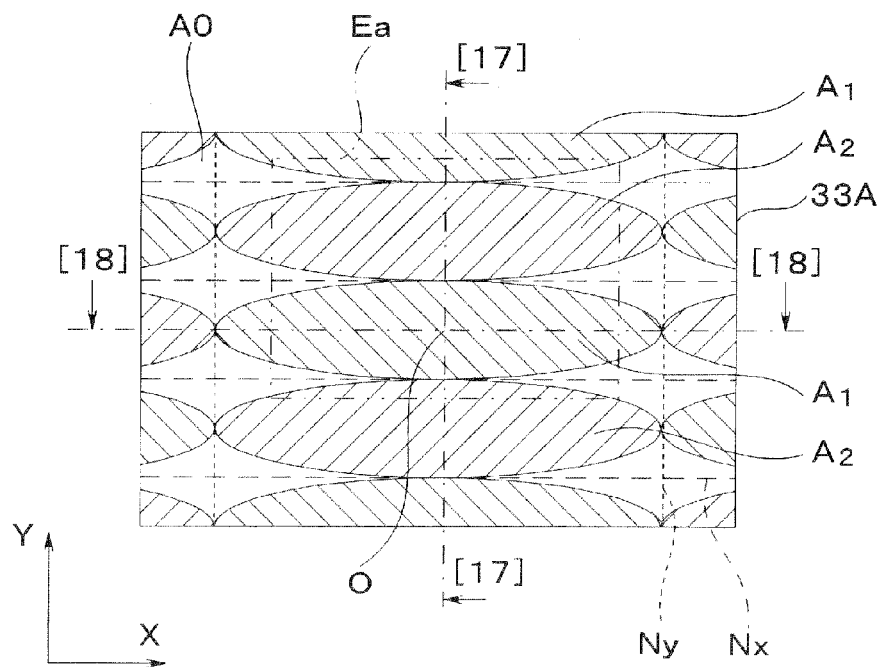
FIG. 16 is a front view showing vibration of a dust-proof filter of a digital camera according to a second embodiment of the present invention.

FIG. 16 is a front view of a dust-proof filter, which shows a state of the vibration generated in the dust-proof filter according to the present embodiment. FIG. 17 is a cross-sectional view taken along the line [17]-[17] in FIG. 16, which is a concept view showing the traveling wave generated in the dust-proof filter. FIG. 18 is a cross-sectional view taken along the line [18]-[18] in FIG. 16.

The dust-proof mechanism including the dust-proof filter according to the present embodiment is different in the following point from the dust-proof filter according to the first embodiment. That is, the first different point is that the arranging position of a piezoelectric device 34Aa as a vibration member for vibration application is located on the obverse side (front face side) of the dust-proof filter 33A, and at a position opposed, via the dust-proof filter 33A, to the arranging position of a piezoelectric device 34Ab as a vibration member for vibration absorption which is arranged on the rear side (rear face side) of the dust-proof filter 33A (FIG. 17). However, the distance H between the center positions of the piezoelectric device 34Aa and the piezoelectric device 34Ab is expressed by the equation: $H = n(\lambda/4)$. The second different point is the shapes of the piezoelectric devices 34Aa and 34Ab. The piezoelectric devices are formed such that the length in the X direction is shorter and the width in the Y direction is larger than those in the first embodiment.

When the piezoelectric devices 34Aa and 34Ab are arranged in an overlapped manner in the Y direction, the width in the Y direction can be made larger with the reduction in the length in the X direction. Accordingly, it is possible to generate and absorb the vibration energy similarly as in the first embodiment. In addition, by shifting a light beam-transmitting area Ea in the Y direction, the dimension in the Y direction can be made smaller. Furthermore, since the length of the piezoelectric device 34Aa in the X direction can be made shorter, the dust-proof-filter pressing member, which is made of a plate spring and the like, can directly presses the dust-proof filter 33A similarly as in the first embodiment, without changing the pressing position. Therefore the same pressing member as the one in the first embodiment can be used. Note that the dimension in the Z direction becomes longer than that in the first embodiment, only in the portion where the piezoelectric device 34Aa is attached, for the thickness of the piezoelectric device 34Aa. However, other dimensions such as the area of the dust-proof filter 33A can be formed smaller. Furthermore, when defining the wavelength of the flexing vibration as λx, the lengths in the X direction of the piezoelectric devices are within λx/2, and the piezoelectric devices 34Aa and 34Ab are in the same phase area in the flexing vibration. Accordingly, vibration can be generated in higher efficiency than in the first embodiment.

Next, as a third embodiment of the present invention, the control of a dust-proof mechanism including a dust-proof filter which is applicable to a digital camera will be described with reference to FIG. 19.

Figure 19:
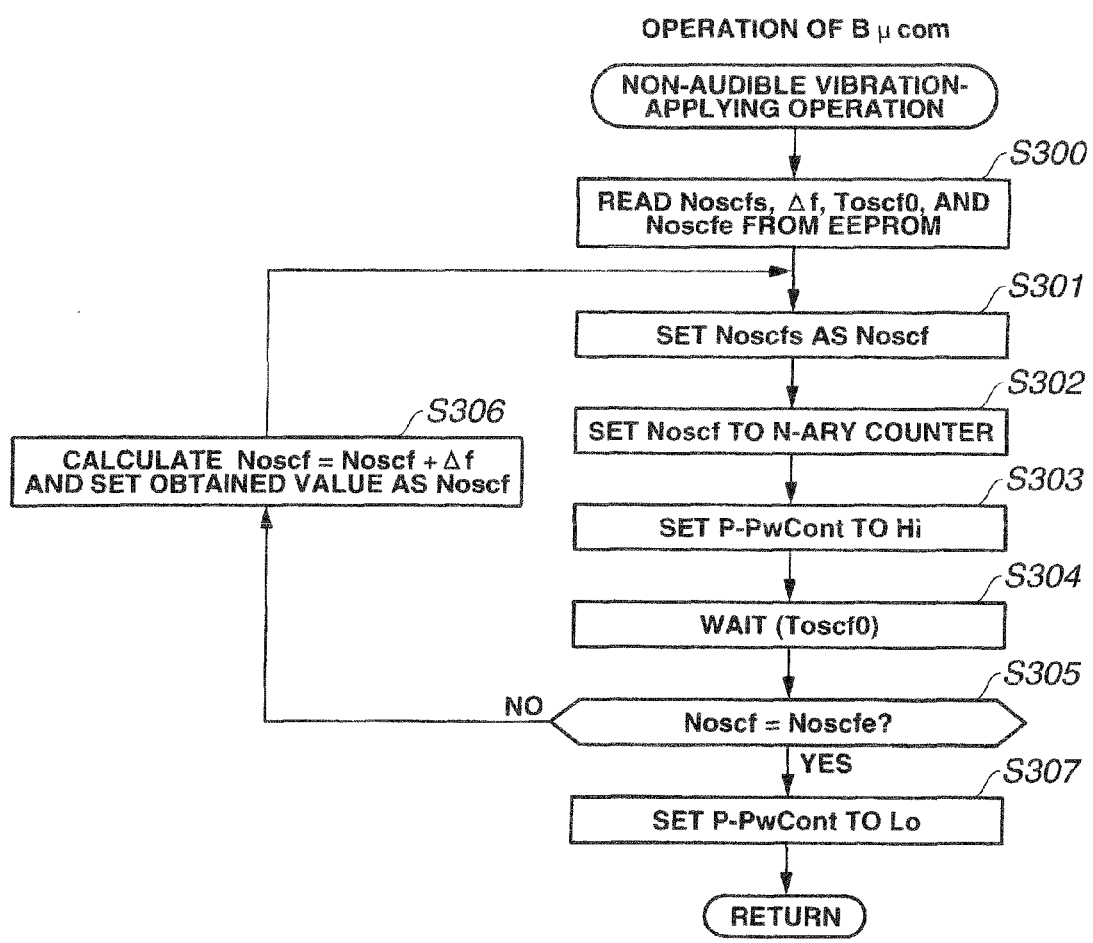
FIG. 19 is a flowchart of non-audible vibration-applying operation in a dust-proof filter controlling circuit in a digital camera according to a third embodiment of the present invention.

FIG. 19 is a flowchart of a subroutine "non-audible vibration-applying operation" in the present embodiment.

In the flowchart of the "non-audible vibration-applying operation" in FIG. 19, the operation of the subroutine "vibration-applying operation" shown in FIG. 13 in the first embodiment is modified. The operation of the dust-proof filter is different from that in the first embodiment. That is, in the first embodiment, the driving frequency of the dust-proof filter 33 is set to the fixed value of f0 to generate a traveling wave. In contrast, in the third embodiment, vibration in which standing-wave vibration and traveling-wave vibration exist in temporally mixed manner is generated. The vibration frequency f0 in the subroutine "non-audible vibration-applying operation" in FIG. 19 is set to a predetermined frequency around the resonant frequency of the dust-proof filter. For example, the vibration frequency is set to 80 kHz in this embodiment. Since the vibration frequency is at least higher than 20 kHz, the vibration is non-audible for the user.

First, in step S300, data related to the driving time period (Toscf0) during which the dust-proof filter 33 is vibrated, a driving start frequency (Noscfs), a frequency shift amount ($\Delta$f), and a driving termination frequency (Noscft) is read from a predetermined storage area in the EEPROM 29.

In step S301, a driving start frequency (Noscfs) is set as the driving frequency (Noscf). In step S302, the driving frequency (Noscf) is outputted from the output port "D-Ncnt" of the Bµcom 50 to the N-ary counter 41 of the dust-proof filter controlling circuit 48.

In the subsequent steps S303 to S307, dust removing operation is performed as follows. First, dust removing operation is started. In step S303, when the control flag of the "P-PwCont" is set to Hi (High value) for dust removal, the piezoelectric device 34a applies vibration to the dust-proof filter 33 at the predetermined driving frequency (Noscf) to generate a standing-wave-based vibration in the dust-proof filter 33. Depending on the configuration of the dust-proof filter 33 and the setting of the Noscfs, also a traveling-wave component is partially generated. Note that the dust adhered to the filter surface is shaken off by the standing-wave vibration. However, it is impossible to remove the dust adhered to the area around the nodes of the standing wave where the vibration amplitude is small. In step S304, vibration is continued during the driving time period (Toscf0).

Next, in step S305, comparison determination is made as to whether the driving frequency (Noscf) is the driving termination frequency (Noscft). When the driving frequency does not match the driving termination frequency (determination is NO), the frequency shift amount ($\Delta$f) is added to the driving frequency (Noscf), and the value obtained by the addition is set again as the driving frequency (Noscf). After that, the operations from the steps S301 to S304 are repeated. When the driving frequency (Noscf) matches the driving termination frequency (Noscft) in step S305 (determination is YES), the control flag of the "P-PwCont" is set to Lo in step S307. The vibration-applying operation by the piezoelectric device 34a is terminated, and a series of "non-audible vibration-applying operations" are terminated.

When the frequency is thus changed, the vibration phase of the piezoelectric device 34Ab is shifted as described above. If the driving start frequency (Noscfs), the frequency shift amount ($\Delta$f), and the driving termination frequency (Noscft) are set so that a traveling-wave-based vibration is generated in the dust-proof filter 33, the standing-wave-based vibration is first generated in the dust-proof filter, and the standing-wave component is gradually reduced and the traveling-wave component is increased. Accordingly, it is possible to control the vibration such that, after the vibration becomes traveling-wave-based vibration, the traveling-wave component is reduced and the standing-wave component is increased again, and finally the standing-wave-based vibration is generated again. Therefore, the dust remained on the dust-proof filter surface in the standing-wave vibration can be shaken off by the above-described traveling-wave vibration. In addition, if the range between the driving start frequency (Noscfs) and the driving termination frequency (Noscft) is set large to some extent, change in the resonant frequency depending on the temperature and manufacturing non-uniformity of the dust-proof transducer 65 can be absorbed and the dust adhered to the dust-proof filter 33 can be surely shaken off with an extremely simple circuit configuration.

Next, as a fourth embodiment of the present invention, a dust-proof mechanism including a dust-proof filter applicable to a digital camera will be described with reference to FIGS. 20 and 21.

Figures 20, 21:
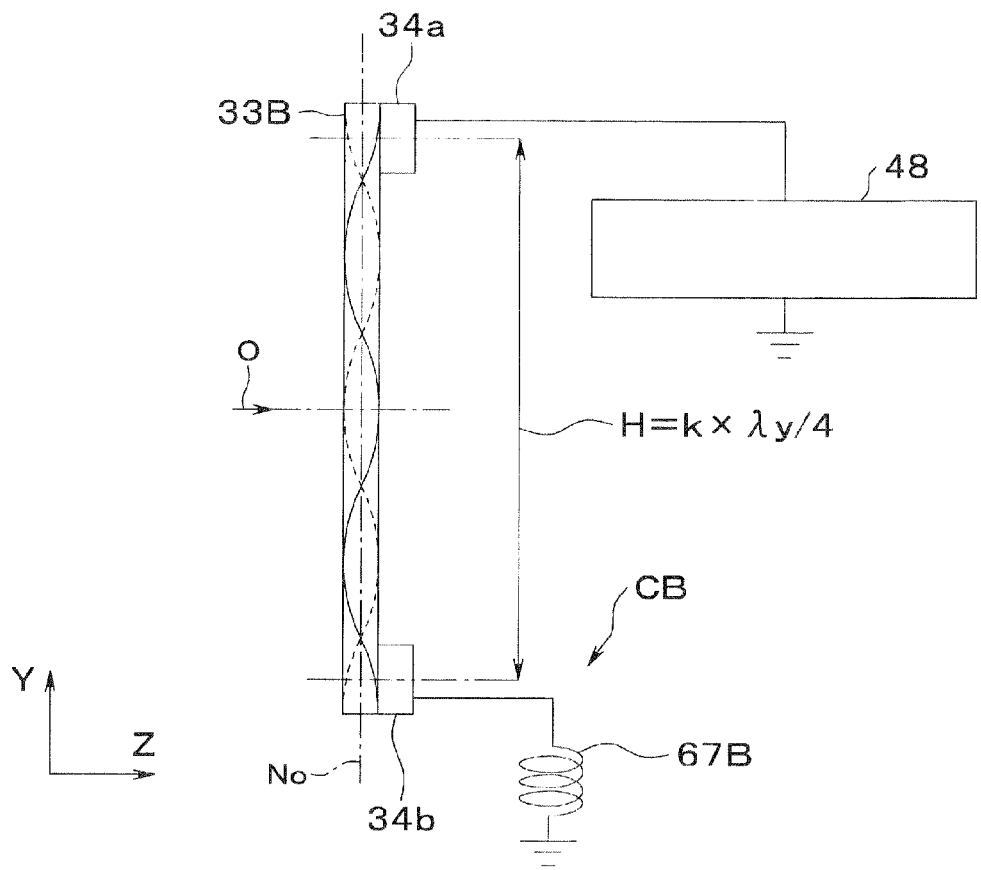
FIG. 20 is a cross-sectional view of a dust-proof filter including a dust-proof filter controlling circuit in a digital camera according to a fourth embodiment of the present invention.
FIG. 21 is a view showing an electric equivalent circuit of a piezoelectric device for vibration absorption of the dust-proof filter in the digital camera in FIG. 20.

FIG. 20 is a cross-sectional view of the dust-proof filter of the dust-proof mechanism according to the present embodiment, which is the cross-sectional view of the dust-proof filter corresponding to one in FIG. 6 in the first embodiment. FIG. 21 shows an electric equivalent circuit in a state where a coil is connected to the piezoelectric device for vibration absorption of the dust-proof filter according to present embodiment.

The setting method of the time phase in the first embodiment has been described with reference to FIG. 9. The present embodiment uses a method in which the vibration phase of the piezoelectric device 34b as a vibration absorbing body can be changed by $\pi/2$ even if frequency is set to any frequency around the resonant frequency. As shown in FIG. 20, a coil 67B is inserted in series in the piezoelectric device 34b. In the present embodiment, the coil 67B has such a function as to delay the vibration phase of the piezoelectric device 34b by $\pi/2$ when electrically resonating. The coil 67B can electrically shift the phase of current as a flow of electric charge, and electrically resonate with the capacitance C0 of the piezoelectric body in the electric equivalent circuit CB3 in FIG. 21, thereby capable of discharging electric charge most efficiently. Similarly, by connecting in series or in parallel a capacitor to the piezoelectric device 34b, when the capacitor electrically resonates, the phase can be advanced by $\pi/2$. As a result, a traveling wave can be generated very efficiently, similarly in the case of using a coil. In addition, the value of the inductance Lk of the coil 67B is set to the value shown in FIG. 21. However, if the inductance is set to another value, a delayed phase can be set to a numeric value other than $\pi/2$.

Furthermore, the following modified example may be used for each of the above-described embodiments. For example, in addition to the dust removing means using the vibration-applying means of the dust-proof mechanism, a method of removing the dust of the dust-proof filter by airflow and a mechanism for removing the dust of the dust-proof filter using a wiper may be used in combination.

In addition, in each of the above-described embodiments, the vibration member for vibration application is the piezoelectric body. However, there is no limitation placed thereon, and an electrostrictive material or a super magnetostrictive material may be used.

Moreover, the dust-proof member as the object for vibration application is not limited to the exemplified dust-proof filter 33 formed by a transparent glass plate, and may be an optical element such as an optical low pass filter (LPF), an infrared cut filter, a polarization filter, or a half mirror, instead of the transparent glass plate, as far as the dust-proof member is a light-transmissive member and located on an optical path.

In addition, in order to effectively shake off the dust adhered to the member to be vibrated at the time of vibrating, coating processing may be applied to the surface of the member to be vibrated so as to coat the surface with an ITO (indium tin oxide) film, an indium zinc film, or a poly-3,4-ethylenedioxythiophene film, as a transparent conductive film, or a surfactant film or a siloxane film, as a hygroscopic antistatic film, for example. However, the values such as the frequency or driving time period related to the vibration and an arranging position of a vibration-absorbing member are required to be set depending on the member.

Furthermore, the optical low pass filter (LPF) 32 described as the first embodiment may be configured as a plurality of pieces of optical low pass filters (LPF) having a birefringent property, and among the plurality of pieces of optical low pass filters (LPF), the optical low pass filter (LPF) arranged closest to the subject side may be used as a dust-proof member (object to be vibrated) instead of the dust-proof filter 33 illustrated in FIG. 2.

In addition, the camera may be configured not to include the optical low pass filter (LPF) 32 illustrated in FIG. 2 as the first embodiment, and the dust-proof filter 33 may be configured by using any one of dust-proof members as the above-described light-transmissive members such as an infrared cut filter, a polarization filter, and a half minor.

Not only the optical low pass filter (LPF) 32 is eliminated from the camera, but also the cover glass 31e illustrated in FIG. 2 may be used as a substitute for the dust-proof filter 33. In this case, the camera may be configured such that a dust-proof and moisture-proof states between the cover glass 31e and the CCD chip 31a are maintained and, as the configuration in which the cover glass 31e is vibrated while being supported, the configuration in which the dust-proof filter 33 illustrated in FIG. 2 is vibrated while being supported may be used. Note that it is needless to say that the cover glass 31e may be configured by using any one of the dust-proof members as the above-described light-transmissive members such as the infrared cut filter, the polarization filter, and the half mirror.

Note that, as an imaging apparatus to which the present invention is applied, description has been made by taking the digital camera as an electronic image pickup apparatus as an example. However, the present invention is not limited to the exemplified digital camera, and can be put into practical use by modifying the digital camera as needed, as long as the digital camera is an imaging apparatus which needs a dust removing mechanism. For example, an imaging apparatus having a configuration in which the dust-proof mechanism of the present invention is disposed between a liquid crystal panel of a liquid crystal projector and a light source can be considered.

The digital camera according to the present invention is capable of efficiently generating, constantly or in a predetermined time period, a traveling wave having a large vibration amplitude such that no standing wave is included, thereby surely capable of removing the dust and the like adhered to the light-transmitting portion of the dust-proof member.

In the present invention, it is apparent that various embodiments can be made in a broad sense based on the present invention without departing from the spirit and scope of the present invention. The present invention is not limited by a specific embodiment except as by the appended claims.

The present invention is not limited to the embodiments described above, and various modifications can be made without departing from the gist of the present invention in implementation of the present invention. Furthermore, the above-described embodiment includes inventions of various stages, and by combining a plurality of constituent components disclosed in the embodiment, inventions of various stages can also be extracted.

The imaging apparatus according to the present invention is capable of efficiently generating, constantly or in a predetermined time period, a traveling wave which has a large vibration amplitude, such that no standing wave is included, thereby surely capable of removing the dust and the like adhered to the light-transmitting portion of the dust-proof member.

What is claimed is:

1. An imaging apparatus comprising:
   an image forming element having an image surface on which an optical image is generated;
   an optical element including a light-transmitting portion through which a subject light passes, the light-transmitting portion being disposed so as to face an image surface of the image forming element with a predetermined distance;
   a vibration member for vibration application arranged at a position which is other than a position where the light-transmitting portion of the optical element is arranged, the vibration member for vibration application vibrating not only a surface of the optical element but also inside of the optical element; and
   a vibration member for vibration absorption arranged at a position which is other than the position where the light-transmitting portion of the optical element is arranged and which is opposed to the vibration member for vibration application, the vibration member for vibration absorption absorbing a part of vibration of the optical element in a predetermined cycle,
   wherein when a wavelength of vibration generated in the optical element by vibration of the vibration member for vibration application is defined as $\lambda$, and an odd number as k, the vibration member for vibration application and the vibration member for vibration absorption are arranged separately from each other at positions on the surface of the optical element such that a distance between centers of the members is expressed by $k \times \lambda/4$.

2. The imaging apparatus according to claim 1, wherein the optical element is a plate-shaped dust-proof member and at least the light-transmitting portion of the optical element has a refractivity different from that of atmosphere.

3. The imaging apparatus according to claim 1, wherein the optical element is a low pass filter.

4. The imaging apparatus according to claim 1, wherein the vibration member for vibration absorption absorbs a component of vibration whose phase is shifted by a phase equivalent to $\pi/2$ from the vibration caused by the vibration member for vibration application.

5. The imaging apparatus according to claim 1, wherein the vibration member for vibration application is arranged in proximity to an area of a node of vibration of the optical element, and
   the vibration member for vibration absorption is arranged in proximity to an area of a loop of vibration of the optical element.

6. The imaging apparatus according to claim 1, wherein the vibration member for vibration application and the vibration member for vibration absorption are piezo-electric bodies which are made of the same material and have the same shape and arranged on the same surface of the optical element.

7. The imaging apparatus according to claim 1, wherein in order to substantially seal a space portion formed between the image surface of the image forming element and the optical element which are opposed to each other, a seal structure portion for sealing the space portion is formed on peripheral sides of the image surface of the image forming element and the optical element.

8. The imaging apparatus according to claim 1, wherein the imaging apparatus is a digital camera, the optical element is made of a rectangular-shaped member and arranged in a main body of the digital camera along a surface which is perpendicular to an optical axis direction of the subject light, the vibration member for vibration application is arranged along one end portion on an upper side of the rectangular-shaped optical element in the main body of the digital camera, in a photographing state where the main body of the digital camera is supported such that the optical axis is horizontal, and the vibration member for vibration absorption is arranged along one end portion on a lower side of the rectangular-shaped optical element in the main body of the digital camera.

9. The imaging apparatus according to claim 1, further comprising a vibration controlling section for controlling the vibration of the vibration member for vibration application, the vibration controlling section performing control to sequentially apply frequencies each changed by a predetermined shift amount such that a resonant frequency at which traveling-wave vibration is generated is set between a start frequency and a termination frequency.

* * * * *